United States Patent [19]

Yonekawa et al.

[11] Patent Number: 4,937,748
[45] Date of Patent: Jun. 26, 1990

[54] ELECTRONIC CONTROLLED FLUID SUSPENSION SYSTEM

[75] Inventors: Takashi Yonekawa, Mishima; Shuuichi Buma; Toshio Aburaya, both of Toyota; Osamu Takeda, Susono; Shunichi Doi, Nagoya, all of Japan

[73] Assignee: Kabushiki Kaisha Toyota Toyota Jidosha Kabushiki Kaisha, Japan

[21] Appl. No.: 240,137

[22] Filed: Sep. 2, 1988

[30] Foreign Application Priority Data

Sep. 4, 1987 [JP] Japan ............................ 62-135882[U]
Sep. 4, 1987 [JP] Japan ................................ 62-222795
Aug. 5, 1988 [JP] Japan ................................ 63-196797
Aug. 5, 1988 [JP] Japan ................................ 63-196798

[51] Int. Cl.$^5$ ............................................. B60G 17/00
[52] U.S. Cl. ................... 364/424.05; 280/707; 280/840
[58] Field of Search ................ 364/424.05; 280/707, 280/709, 772, 688, 689, DIG. 1, 840

[56] References Cited

U.S. PATENT DOCUMENTS 4,712,807 12/1987 Kurosawa ...................... 364/424.05
4,761,022 8/1988 Ohashi et al. ....................... 280/707
4,765,649 8/1988 Ikemoto et al. ..................... 280/707
4,821,191 4/1989 Ikemoto et al. ................ 364/424.05

FOREIGN PATENT DOCUMENTS 0106697 4/1984 European Pat. Off. .
61-193908 8/1986 Japan .
8402886 8/1984 World Int. Prop. O. .

Primary Examiner—Gary Chin
Attorney, Agent, or Firm—Oliff & Berridge

[57] ABSTRACT

An electronic controlled suspension system detects a load on the fluid actuators and calculates a torsional load on the vehicle. Responsive to the calculated torsional load, corrective control is executed on the fluid flow to and from the fluid actuators, eliminating torsional load on the vehicle. Therefore, the driving characteristic is prevented from changing due to an unbalanced load on the vehicle. On the other hand, the electronic controlled suspension system detects a vehicle's cornering state. Responsive to the cornering state detected, control signals are output to increase the roll stiffness distribution to the front wheels. As a result, the roll stiffness distribution to the front wheels while the vehicle is about to corner becomes larger than that while the vehicle is steadily cornering. Responsive to the control signals, the vehicle attitude is controlled by supplying and discharging fluid to and from fluid actuators. Consequently, when the vehicle is just starting to corner, laterally moving load is controlled, and quick-responsive steering is realized.

7 Claims, 34 Drawing Sheets

ELECTRONIC CONTROLLED FLUID SUSPENSION SYSTEM

BACKGROUND OF THE INVENTION

This invention relates to an electronic controlled fluid suspension system for altering the steering characteristic of a vehicle.

In order to enhance ride comfort, maneuverability and steering stability of the vehicle, various suspension systems have been proposed which prevent the vehicle from pitching and rolling by supplying and discharging fluid to and from the fluid actuators thereof. For example, a system, disclosed in Japan published unexamined utility model application No. 60-174609, prevents a vehicle from rolling by supplying and discharging fluid to and from fluid actuators. The valve energizing time interval for the fluid supply and discharge is obtained based on a map of vehicle speed and steering angle predetermined in response to steering speed, or a map of vehicle speed and steering speed. Another type of system, disclosed in Japan published unexamined patent application No. 61-193909, controls vehicle attitude, namely, prevents the vehicle from rolling and pitching by supplying and discharging fluid to and from fluid actuators. Relative sprung and unsprung displacement is detected, and feedback control is executed so that the actual displacement should conform with target displacement.

However, in this prior art, when fluid is supplied into and discharged from fluid actuators at the same time to control the vehicle attitude, or when fluid is supplied into and discharged from fluid actuators under open loop control according to an expected change in vehicle attitude, actual supplied and discharged fluid differs in volume from expected fluid due to inconsistent quality in control valves, fluid actuators, etc. caused during manufacturing. As a result, an incorrect load is applied to the wheel fluid actuators A1, A2, A3 and A4, so that the front wheels are turned in a direction different from that of the rear wheels, as shown in FIG. 33. The load on the actuators A1 and A4 is heavy, and the internal pressure thereof is high. Accordingly, it becomes hard to supply fluid to the actuators, and the energizing time interval of control valves lengthens. As the valve energizing time interval lengthens, the internal pressure of the fluid actuators becomes more unbalanced and large torsional force is likely exerted on the vehicle. Such conditions sometimes arise even when feedback control over displacement is carried out and the fluid supply to and discharge from the fluid actuators is controlled.

Even when the front wheels are thus turned in a direction opposite to the rear wheels, the rigidity of the vehicle keeps the vehicle level. However, when the torsional force is applied to the vehicle, a single front wheel or a single rear wheel has to support the vehicle weight. Accordingly, a problem is that the running characteristic largely changes, for example, the friction coefficient of wheels decreases, or the steering characteristic of the vehicle changes from over-steering to under-steering.

In order to change steering characteristic by altering the distribution of roll stiffness among the wheels of a vehicle through suspension control when a vehicle corners, various suspension systems have been proposed. As shown in FIG. 26, the cornering power and the load on the inner and outer wheels of a cornering vehicle have a non-linear relationship. When the load moving between the inner and outer wheels is small as shown by an arrow a, the sum of inner-wheel side load CP2I and outer-wheel side load CP2O corresponds to the cornering power On the other hand, when the load moving between inner and outer wheels is large as shown by an arrow b, the cornering power is the sum of innerwheel side load CP1I and outer-wheel side load CP1O. The above cornering powers have the following relationship:

2CPX>(CP2O+CP2I)>(CP1O+CP1I)

In this way, when the vehicle corners, the smaller the load moving between inner and outer wheels, the larger the cornering power is.

The vehicle's steering characteristic is determined by the formula below:

$Cr \cdot Lr - Cf \cdot Lf = Z$, where

Cr relates to the cornering power of rear wheels, Lr the distance between rear-wheel axle and vehicle's center of gravity, Cf the cornering power of front wheels, and Lf the distance between front-wheel axle and vehicle's center of gravity. A negative value of Z indicates an over-steering characteristic of the vehicle, a zero value indicates a neutral steering characteristic and positive value indicates an under-steering characteristic. When the vehicle corners, a front-wheel moving load is controlled to be a minimum, and consequently the front-wheel cornering power increases, resulting in an over-steering characteristic of the vehicle. Alternatively, when the front-wheel moving load is controlled to increase, the front-wheel cornering power diminishes, resulting in an under-steering characteristic of the vehicle.

For example, in a system disclosed in Japan published unexamined patent application No. 61-193908, a suspension system is controlled by compensating for the difference between target and actual sprung and unsprung strokes based on a value of the detected lateral acceleration. The steering characteristic of the cornering vehicle can be arbitrarily changed by setting the laterally moving load of front and rear wheels arbitrarily according to lateral acceleration.

Yet, as for the conventional vehicle, a stability factor Kh has the following relation with a yawing resonance frequency fy. The ratio of yaw rate YR to steering angle MA is shown in the formula below:

$$Kh = (Wf/Cf - Wr/Cr)/(L \cdot G)$$

$$fy = L \cdot \{Cf \cdot Cr \cdot (1/V^2 + Kh)/(M \cdot I)\}^{\frac{1}{2}}/2\pi, \text{ and}$$

$$YR/MA = \{V/(1 + Kh \cdot V^2)\}/(L \cdot N), \text{ where}$$

L is wheel base, Wf and Wr are the grounded load of the front and rear wheels, M is the mass of the vehicle, I is the moment of inertia in a direction of yaw, V is the vehicle speed, and N is the gear ratio of the steering wheel.

A dynamic characteristic of the vehicle's yaw rate establishes the graph in FIG. 25, in which the ordinate plots the ratio of yaw rate YR to steering angle MA and the difference in phase between the steering angle and the yaw rate, and the abscissa plots a frequency, i.e., steering speed.

More specifically, when the inner and outer-wheel suspensions receive roll of the vehicle body as shown by a solid line in FIG. 25, the vehicle yaw rate varies with steering speed. As the steering speed accelerates, a phase lag develops, and responsiveness to yaw is impaired. A problem is that the yaw rate does not respond to steering speed rapidly due to phase lag, and that dull-responsive steering results. When the vehicle corners, an over-steering characteristic is set by reducing the front-wheel moving load. Then, the front-wheel cornering power Cf increases as aforementioned. According to the aforementioned formula, the stability factor Kh decreases, the ratio of yaw rate YR to steering angle MA increases, and the steering effectiveness also increases. However, another problem is that the yawing resonance frequency fy, namely, the responsiveness to yaw diminishes.

This invention further relates to an electronic controlled fluid suspension system for controlling vehicle attitude by supplying and discharging fluid into and from fluid actuators.

SUMMARY OF THE INVENTION

The object of the present invention is to provide an electronic controlled fluid suspension system for realizing quick-responsive steering control when a steering wheel is operated.

Another object of the present invention is to provide an electronic controlled fluid suspension system for preventing the running condition from worsening due to an unbalanced load on fluid actuators and torsional force being applied on a vehicle.

These objects are attained by an electronic controlled fluid suspension system comprising: a fluid suspension M11 corresponding to each wheel and having a fluid actuator; a load detection means M13 for detecting a suspension load applied to the fluid suspension M11; a torsional load calculation means M14 for calculating a torsional load applied to the vehicle in response to the suspension load; a compensation control means M15 for determining an undesired torsional load in accordance with the suspension load and calculating a control amount in order to remove the undesired torsional load; and a fluid flow control means M12 responsive to the control amount for controlling fluid flow to and from the fluid actuators.

BRIEF DESCRIPTION OF THE DRAWINGS

By way of example and to make the description clearer, reference is made to the accompanying drawings in which.

DETAILED DESCRIPTION OF PREFERRED EMBODIMENTS

Set forth is the explanation of embodiments of the present invention based on the attached drawings.

Figure 2:
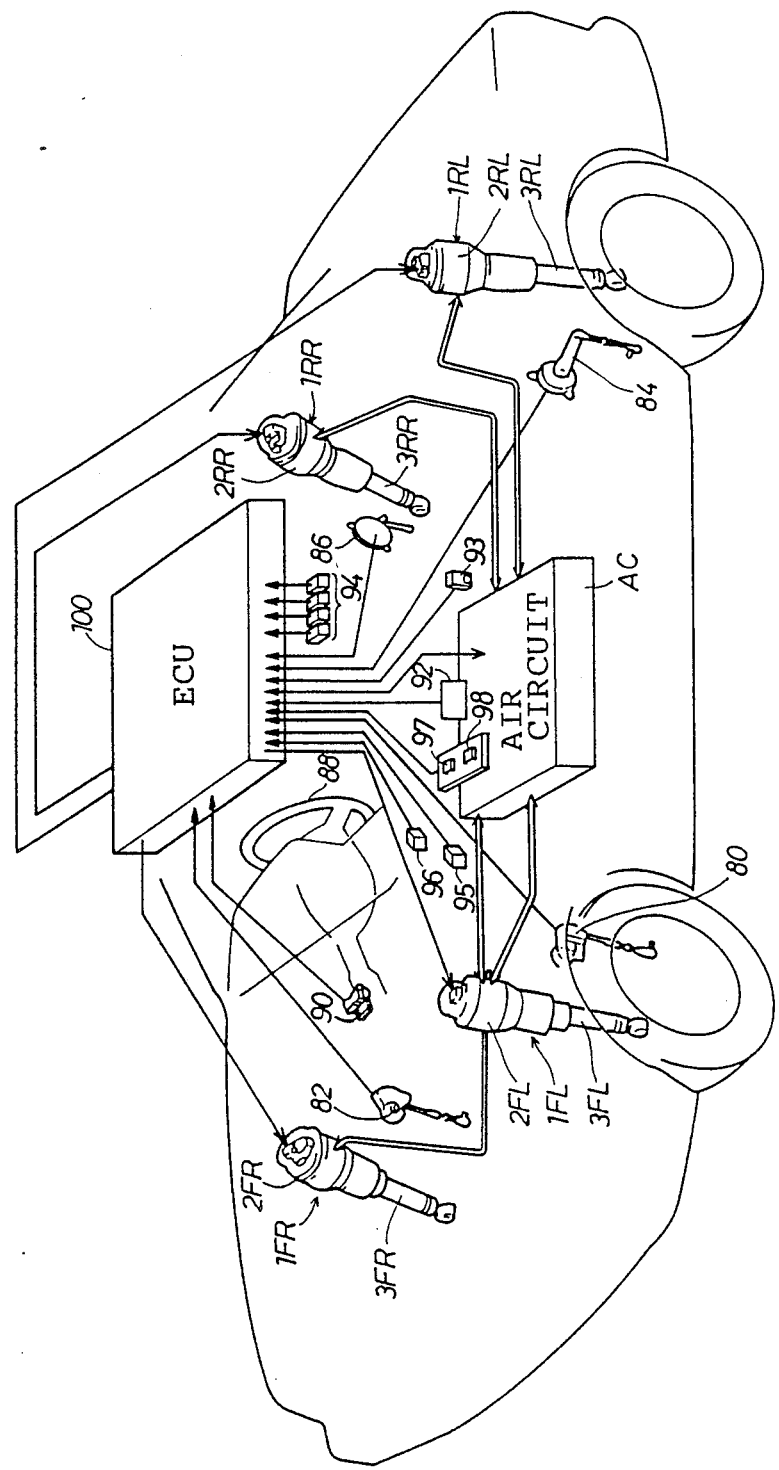
FIG. 2 is a schematic view of an electronic controlled air suspension system according to the embodiment of the present invention.
Figure 3:
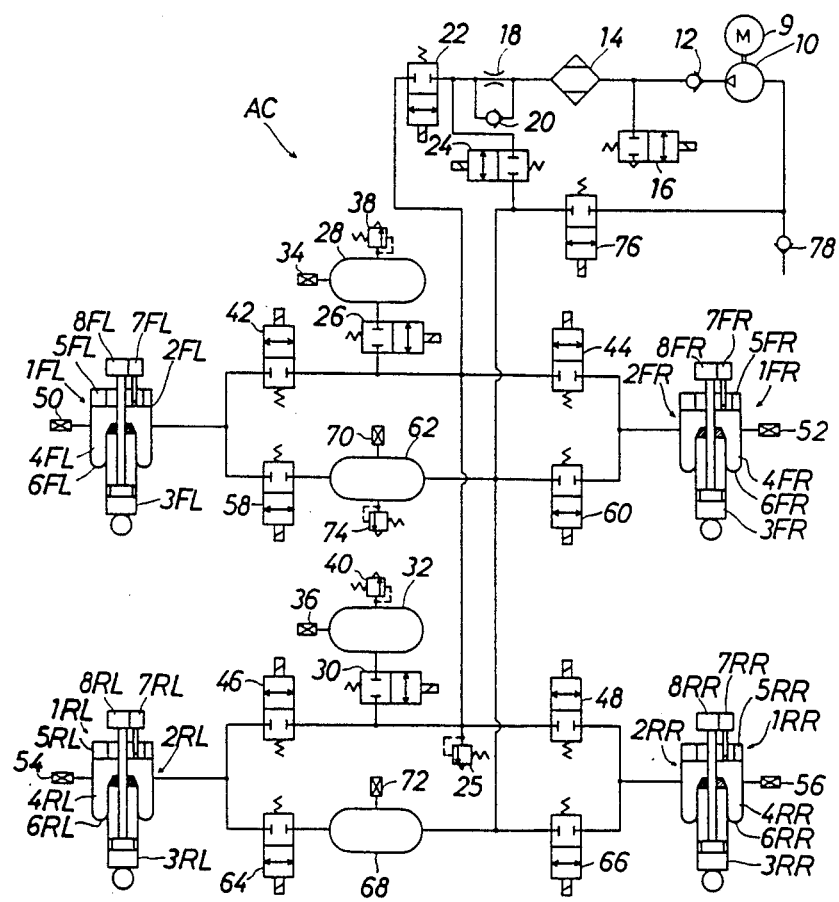
FIG. 3 is an air circuit diagram of the embodiment.

As shown in FIGS. 2 and 3, the electronic controlled air suspension system of the present embodiments is equipped with a front-wheel left suspension 1FL, a front-wheel right suspension 1FR, a rear-wheel left suspension 1RL and a rear-wheel right suspension 1RR, all of which are connected to an air circuit AC. These suspensions 1FL, 1FR, 1RL and 1RR are equipped with air springs as fluid actuators 2FL, 2FR, 2RL and 2RR and shock absorbers 3FL, 3FR, 3RL and 3RR, respectively. The air springs 2FL, 2FR, 2RL and 2RR are equipped with main air chambers 4FL, 4FR, 4RL and 4RR and auxiliary air chambers 5FL, 5FR, 5RL and 5RR, respectively. The main air chambers 4FL, 4FR, 4RL and 4RR are partially formed of diaphragms 6FL, 6FR, 6RL and 6RR so that the height of the vehicle can be changed by supplying and discharging air to and from the main air chambers 4FL, 4FR, 4RL and 4RR. The air springs 2FL, 2FR, 2RL and 2RR can have their spring constants changed to "low", "medium" and "high" states by energizing spring actuators 7FL, 7FR, 7RL and 7RR to either provide/block communications between the main air chambers 4FL, 4FR, 4RL and 4RR and the auxiliary air chambers 5FL, 5FR, 5RL and 5RR or to switch the air flow rates. The shock absorbers 3FL, 3FR, 3RL and 3RR can have their damping force changed to "low", "medium" and "high" by energizing absorber actuators 8FL, 8FR, 8RL and 8RR to control the flow rate of working fluid passing through orifices (not shown).

The air circuit AC is equipped with a compressor 10 which is driven by a compressor motor 9 so that it may act as a compressed air supply source for the air springs 2FL, 2FR, 2RL and 2RR. The compressor 10 has its discharge side connected to an air drier 14 and a discharge valve 16 through a check valve 12 for preventing any back flow. Silica gel is provided in the air drier 14 to remove moisture from the compressed air. This air drier 14 is connected to the respective one side of a supply valve 22 and a change-over valve 24 through a fixed throttle 18 and a check valve 20 for preventing any back flow. The other side of the supply valve 22 is connected to a relief valve 25 set at a predetermined pressure, and through a high pressure reserve valve 26 to a front high pressure reserve tank 28, and through another high pressure reserve valve 30 to a rear high pressure reserve tank 32. These high pressure reserve valves are optionally communicable and discommunicable. The high pressure reserve tanks 28 and 32 are respectively equipped with pressure sensors 34 and 36 for detecting the air pressures in the high pressure reserve tanks 28 and 32 and relief valves 38 and 40 set at a predetermined pressure.

The above-mentioned side of the supply valve 22 is further connected through a leveling valve 42 to the main air chamber 4FL, through a leveling valve 44 to the main air chamber 4FR, through a leveling valve 46 to the main air chamber 4RL, and through a leveling valve 48 to the main air chamber 4RR. Connected to these main air chambers 4FL, 4FR, 4RL and 4RR, respectively, are pressure sensors 50, 52, 54 and 56 for detecting the air pressures.

The main air chamber 4FL at the front left side and the main air chamber 4FR at the front right side are connected to a front low pressure reserve tank 62, respectively, through a discharge valve 58 and a similar discharge valve 60. Moreover, the main air chamber 4RL at the rear left side and the main air chamber 4RR at the rear right side are connected to a rear low pressure reserve tank 68, respectively, through a discharge valve 64 and a similar discharge valve 66. On the other hand, the front low pressure reserve tank 62 and the rear low pressure reserve tank 68 are connected to have communication at all times. To these low pressure reserve tanks 62 and 68, respectively, there are connected pressure sensors 70 and 72 for detecting the air pressures in the reserve tanks 62 and 68. To the front low pressure reserve tank 62, there is connected a relief valve 74 which is set at a predetermined pressure.

These two low pressure reserve tanks 62 and 68 are connected to the other side of the aforementioned change-over valve 24 and further to the suction side of the compressor 10 through a suction valve 76. Connected to the suction side of the compressor 10, is a check valve 78 for intaking external air.

The present embodiment is otherwise practicable without the check valve 78 by making a closed air circuit which is filled with air or other gas, e.g., nitrogen gas.

The aforementioned discharge valve 16, supply valve 22, change-over valve 24, high pressure reserve valves 26 and 30, leveling valves 42, 44, 46 and 48, discharge valves 58, 60, 64 and 66, and suction valve 76 are of the normally closed two-position type in the present embodiments.

The present air circuit AC is equipped at its front-wheel side and rear-wheel side with two high pressure reserve tanks 28 and 32 and two low pressure reserve tanks 62 and 68. It is also possible to provide a common high pressure reserve tank and a common low pressure reserve tank.

As shown in FIG. 2, in the suspension system of the present embodiment, there are provided: a height sensor 80 as the vehicle height detection means for detecting the distance between the left front wheel and the vehicle body, i.e., the left front height; a height sensor 82 for detecting the right front height; a height sensor 84 for detecting the left rear height; and a height sensor 86 for detecting the right rear height. These height sensors 80, 82, 84, and 86 output signals corresponding to a difference between a detected vehicle height and a predetermined standard vehicle height. When the detected vehicle height is larger than the standard height, a positive signal corresponding to the difference is output. For a height equal to the standard height, a zero signal is output. For a height smaller than the standard height, a negative signal corresponding to the difference is output.

There are also provided: a steering angle sensor 90 for detecting a steering angle of a steering wheel 88; an acceleration sensor 92 for detecting the longitudinal and lateral accelerations of the vehicle body; a vehicle speed sensor 93 for detecting a vehicle speed based on a revolution speed of the output shaft of a transmission (not shown); a door switch 94 for detecting each door closed; a neutral switch 95 for detecting a speed transmission shifted to neutral; and a throttle opening sensor 96 for detecting the opening of a throttle valve to control the intake air flow to an engine (not shown). Further provided are high and low level switches 97 and 98 which are manually operated to instruct the vehicle height.

Figure 4:
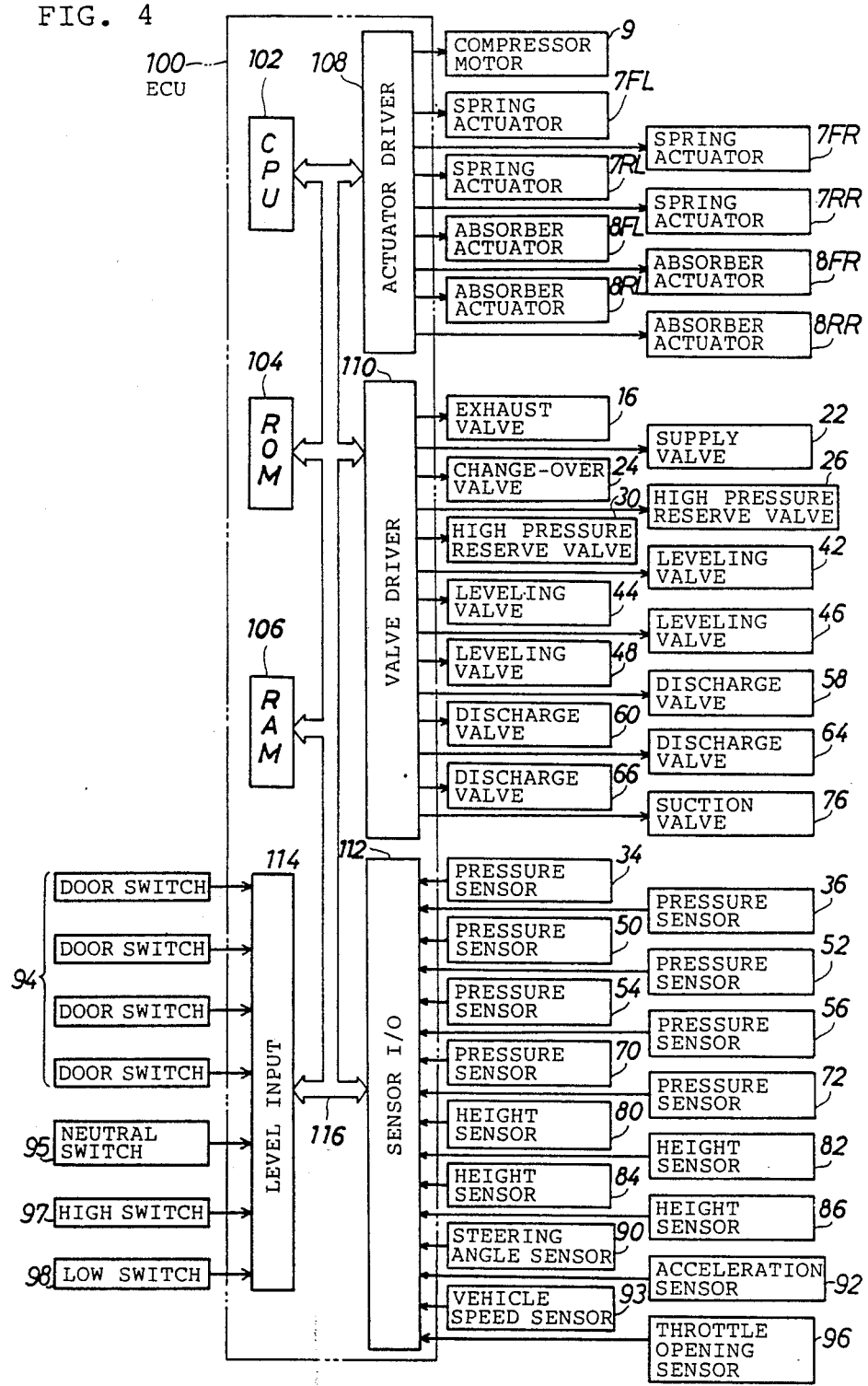
FIG. 4 is a block diagram indicating the construction of an electric system according to the embodiment.

The electrical system of the present embodiment will be described with reference to the block diagram shown in FIG. 4. The aforementioned individual air suspensions 1FL, 1FR, 1RL and 1RR are driven and controlled by an electronic control circuit 100 to control the attitude of the vehicle. This electronic control circuit 100 is constructed as a logical arithmetic circuit and includes, as shown in FIG. 4, known CPU 102, ROM 104 and RAM 106. These CPU 102, ROM 104 and RAM 106 are mutually connected with input/output circuits, such as a actuator driver 108, a valve driver 110, a sensor input/output circuit 112 and a level input circuit 114 by way of a common bus 116.

The CPU 102 receives the signals of the pressure sensors 34, 36, 50, 52, 54, 56, 70 and 72, the height sensors 80, 82, 84 and 86, the steering angle sensor 90, the acceleration sensor 92, the vehicle speed sensor 93 and the throttle opening sensor 96 by way of the sensor input/output circuit 112, and receives the signals of the door switch 94, the neutral switch 95, and the high and low level switches 97 and 98 by way o the level input circuit 114. In response to these signals and the data in the ROM 104 and the RAM 106, on the other hand, the CPU 102 controls the individual air suspensions 1FL, 1FR, 1RL and 1RR by outputting drive signals to the compressor motor 9, the spring actuators 7FL, 7FR, 7RL and 7RR and the absorber actuators 8FL, 8FR, 8RL and 8RR through the actuator driver 108 and by outputting drive signals to the discharge valve 16, the supply valve 22, the change-over valve 24, the high pressure reserve valves 26 and 30, the leveling valves 42, 44, 46 and 48, the discharge valves 58, 60, 64 and 66 and the suction valve 76 through the valve driver 110.

The ROM 104 stores maps shown in FIGS. 10-22 and FIGS. 27A-31 described later.

The processing procedures to be executed in the electronic control circuit 100 described above will be explained with reference to the flowchart of FIGS. 5 through 9.

Figure 5:
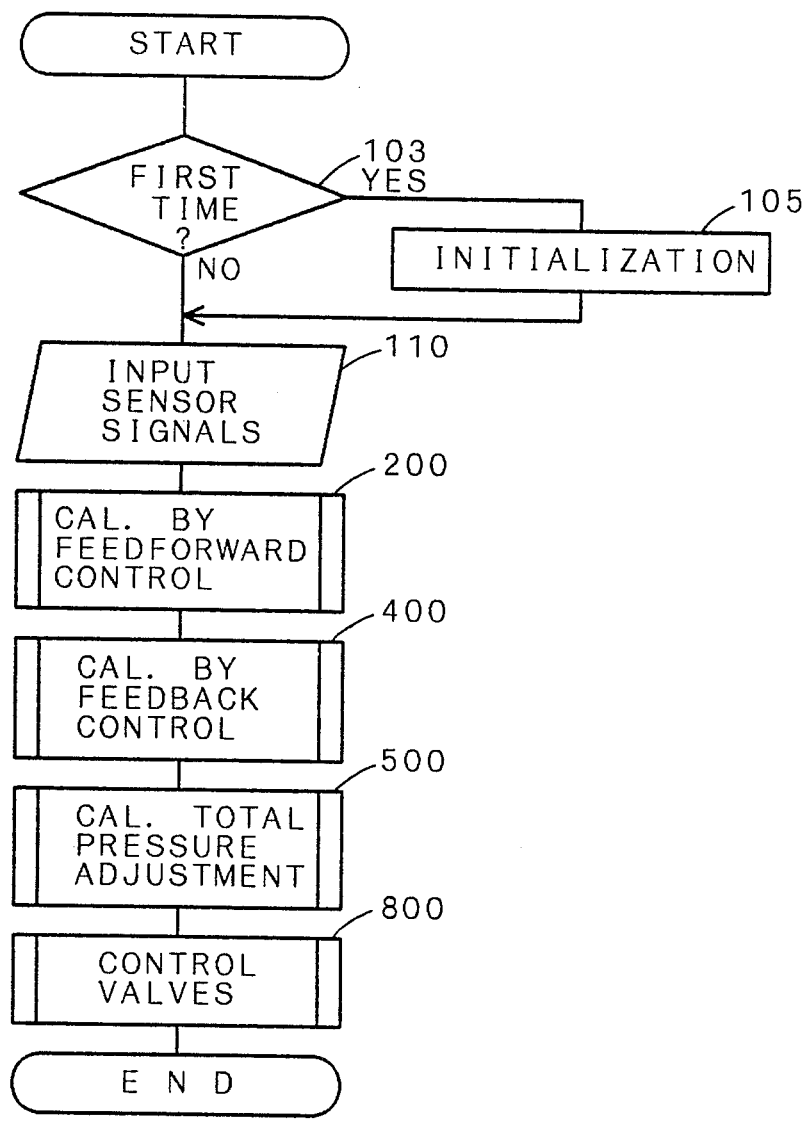
FIG. 5 is a general flowchart of a suspension control routine executed in an electronic control circuit of the embodiment.

The process routine of FIG. 5 is repeatedly executed in a predetermined cycle.

At step 103 it is determined whether or not this program is executed for the first time, i.e., from the beginning of a program cycle. If YES, the program proceeds to step 105 at which initialization of various flags and variables is executed. Subsequently, at step 110 signals from the pressure sensors 34, 36, 50, 52, 54, 56, 70 and 72, the height sensors 80, 82, 84 and 86, the steering angle sensor 90, the acceleration sensor 92, the vehicle speed sensor 93, and the throttle opening sensor 96 are input through the sensor input circuit 112.

Subsequent step 200 executes a feedforward control of a vehicle attitude by supplying and discharging air to and from the air springs 2FL, 2FR, 2RL and 2RR of the suspensions 1FL, 1FR, 1RL and 1RR when a vehicle rolls. In the feedforward control, a lateral acceleration GRLM, which will develop on the vehicle body as the steering wheel is operated, is expected. In response to the expected lateral acceleration GRLM, the control amounts (pressures) of the air springs 2FL, 2FR, 2RL and 2RR are calculated so that roll is prevented or minimized to a predetermined small angle.

At step 400, a feedback control is executed as another vehicle attitude control for avoiding roll. In the feedforward control, the control amounts (pressures) of the air springs 2FL, 2FR, 2RL and 2RR are calculated to stabilize the vehicle attitude under the condition that the acceleration of the vehicle is not greatly changed.

Step 500 calculates a total pressure adjustment for the wheels, namely, obtains the sum of pressure adjustment amounts calculated in the above-mentioned feedforward control and feedback control. A target roll stiffness distribution FM is calculated when the vehicle just starts cornering, and in response to the target roll stiffness distribution FM, the total adjustment is further modified. Alternatively, a torsional force FW as a torsional load on the vehicle is calculated based on the pressure of the air springs 2FL, 2FR, 2RL and 2RR. Responsive to the torsional force FW, the total pressure adjustment is modified.

Step 800 executes a valve control for opening/closing appropriate valves among the high pressure reserve valves 26 and 30, the leveling valves 42, 44, 46 and 48 and the discharge valves 58, 60, 64 and 66 based on the total pressure adjustment calculated at step 500. To open and close the appropriate valves, the driving duty ratio is calculated.

The above-mentioned feedforward control, feedback control, calculation of the total pressure adjustment and the valve control are respectively explained in detail with reference to the flowcharts of FIGS. 6, 7, 8A, 8B, 8C and 9.

Figure 6:
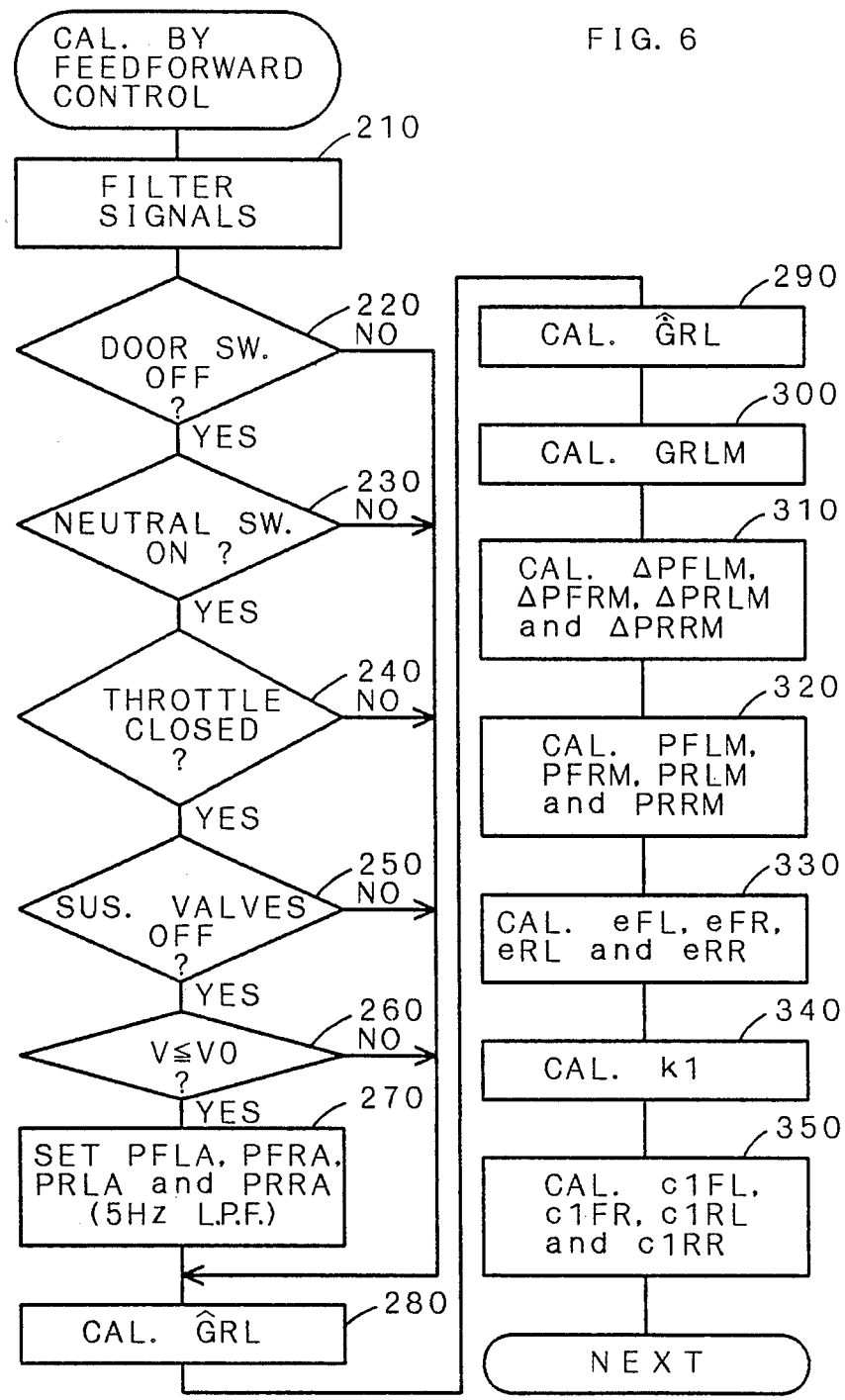
FIG. 6 is a flowchart of a feedforward calculation routine.

Set forth is an explanation of the feedforward control based on the flowchart of FIG. 6. As the first step of this flowchart, signals input from the sensors are filtered at step 210. A filtered output Y(n) is given by the following formula:

$Y(n) = \{IF \cdot X(n) + (256 - IF) \cdot Y(n-1)\}/256$, in which $X(n)$ is the current data input, $Y(n-1)$ is the prior filtered output and IF is a filtering constant (varying from 1 through 256). By filtering, noise and data fluctuations of a frequency higher than a preset threshold value can be eliminated.

Subsequently, a series of determinations are executed for determining values of factors which will cause a change in the vehicle attitude. At step 220, it is determined whether or not the door switch 94 is off. If all of the doors are closed, it is determined at step 230 whether or not the neutral switch 95 is on. If a transmission is in the neutral position, at step 240 the throttle opening sensor 96 determines whether a throttle valve is closed. At step 250, it is determined whether the vehicle height control is now in effect. Namely, it determines whether the suspension control valves such as the high pressure reserve valves 26 and 30, the leveling valves 42, 44, 46 and 48, the discharge valves 58, 60, 64 and 66 are in a OFF mode. At step 260, it is determined whether the vehicle speed V detected by the vehicle speed sensor 93 is equal to or lower than a preset value VO ($V \leq VO$). The purpose of the process steps 220, 230, 240 and 260 is to determine the values of factors which will cause a change in the vehicle attitude, e.g., opening/closing of the doors which indicate boarding of passengers, a shift position of the transmission indicating a transmission of power to the wheels, an amount of air taken into an internal combustion engine generating the driving force of the vehicle, and the vehicle speed representing the driving state. The purpose of the process step 250 is to determine whether supplying/discharging of the air for controlling the pressures of the air springs 2FL, 2FR, 2RL and 2RR is not executed.

If all of the answers to the above-mentioned determination steps 220 through 260 are YES, it is assumed that the vehicle attitude is stable, and that the pressures of the air springs 2FL, 2FR, 2RL and 2RR are not undergoing any remarkable change. In this case, the current values of the pressure sensors 50, 52, 54 and 56 are respectively stored in the RAM 106 as standard pressures PFLA, PFRA, PRLA and PRRA. The value of the filtering constant IF used at step 210 is set so that the pressures PFLA, PFRA, PRLA and PRRA are values which are obtained from data filtered by a low pass filter with a lower threshold frequency (e.g., 5Hz) than that used in the filtering executed at step 210.

On the other hand, if any one of the answers to steps 220 through 260 is NO, step 270 is not executed, namely the standard pressures PFLA, PFRA, PRLA and PRRA are not updated. Namely, under the condition that all of the answers at steps 220 through 260 are YES, the standard pressures PFLA, PFRA, PRLA and PRRA are updated each time.

Figure 10:
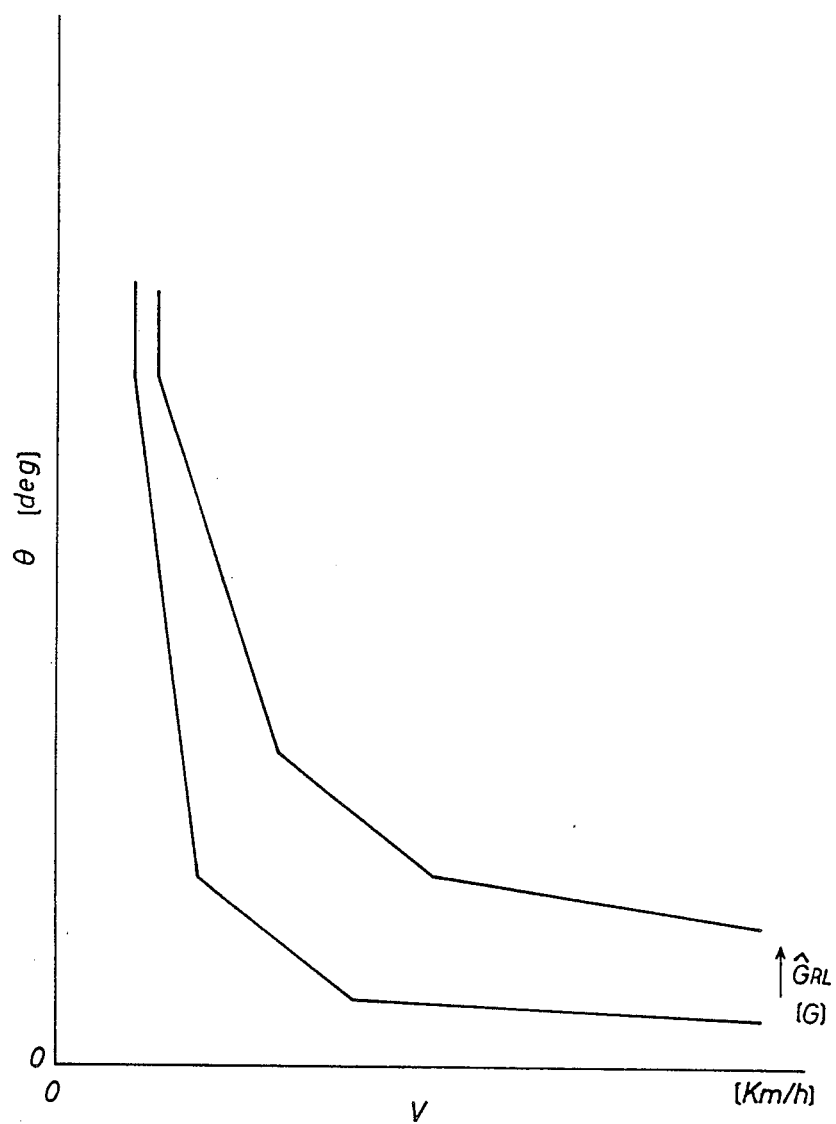
FIG. 10 is a graph for determining an estimated lateral acceleration $\hat{G}RL$ based on a steering angle $\theta$ and a vehicle speed V.

After step 270, or if any answer to process steps 220 through 260 is NO, the program proceeds to step 280 which calculates an estimated lateral acceleration $\hat{G}RL$ based on a vehicle speed V and a steering angle $\theta$, with reference to the graph of FIG. 10. Only two examples of different accelerations are shown in the map of FIG. 10, assuming that other cases also bear similar relations. The values of other accelerations can be calculated by interpolation if necessary.

Figure 11:
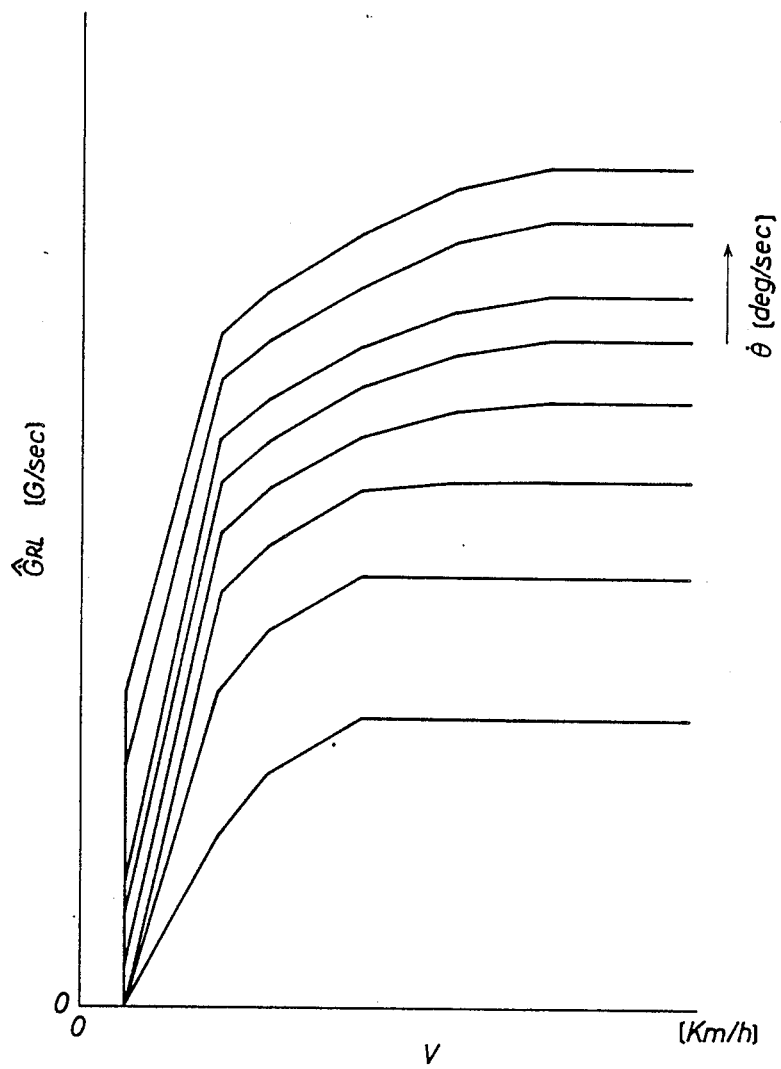
FIG. 11 is a graph for determining an estimated lateral accelerating rate based on a steering angle speed $\dot{\theta}$ and a vehicle speed V.

Step 290 calculates an estimated lateral accelerating rate $\dot{G}RL$ based on a relation between the vehicle speed V and a steering angle speed $\dot{\theta}$, i.e., a differential of the above-mentioned steering angle $\theta$, with reference to the graph of FIG. 11. The steering angle speed $\dot{\theta}$ may be replaced with a change in the steering angle $\theta$ over a predetermined short period. FIG. 11 illustrates examples for eight different steering angle speeds $\dot{\theta}$. Other values can be obtained by interpolation.

Step 300 calculates expected lateral acceleration GRLM according to the following formula:

$$GRLM = m \cdot \hat{G}RL + h \cdot \dot{G}RL, \text{ where}$$

m and h are constants having values determined by taking the responsiveness of the system into account. When the responsiveness of the system is low, the value of the constant h is made greater. But, as an excessively large value of h will introduce instability in the system, the constants m and h are determined through prior experiments (e.g., m=1.0, h=0.1).

Figure 12:
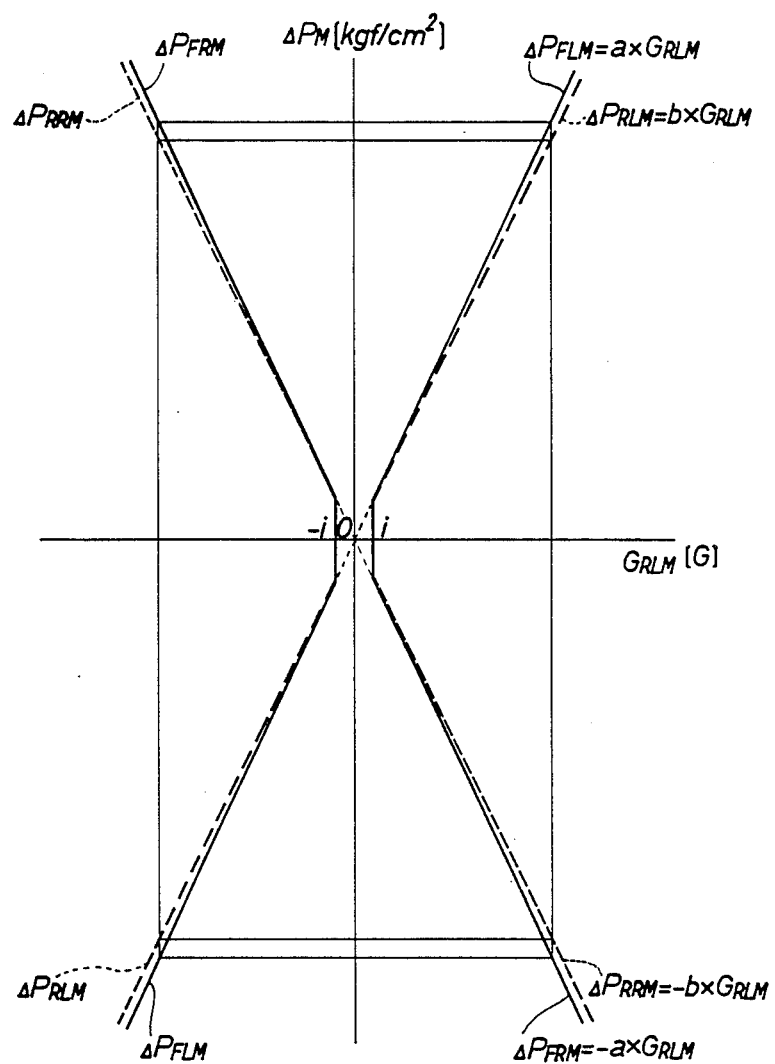
FIG. 12 is a graph for determining target pressure differences $\Delta PFLM$, $\Delta PFRM$, $\Delta PRLM$, $\Delta PRRM$ from an expected lateral acceleration GRLM.

Subsequent step 310 calculates target pressure differences $\Delta PFLM$, $\Delta PFRM$, $\Delta PRLM$ and $\Delta PRRM$ of the air springs 2FL, 2FR, 2RL and 2RR of the suspensions 1FL, 1FR, 1RL and 1RR, by utilizing the above-mentioned expected lateral acceleration GRLM with reference to the graph of FIG. 12, in which the abscissa plots the expected lateral acceleration GRLM [G, which is the unit equal to the gravitational acceleration] and the ordinate plots the target pressure difference [kgf/cm²]. The target pressure differences $\Delta PFLM$, $\Delta PFRM$, $\Delta PRLM$ and $\Delta PRRM$ are determined as shown in the graph of FIG. 12 and are also represented by formulas as follows:

$$\Delta PFLM = \frac{a}{19} GRLM$$

$$\Delta PFRM = -a \cdot GRLM$$

$$\Delta PRLM = b \cdot GRLM \text{ and}$$

$$\Delta PRRM = -b \cdot GRLM, \text{ where}$$

a and b are coefficients for compensating for the difference in the characteristic of individual suspensions. Values of these coefficients a and b are established in the formulas below:

$$a = \{W \cdot h/(tf \cdot rd \cdot Af)\} \cdot \{(Lr/L) \cdot Kf\} \text{ and}$$

$$b = \{W \cdot h/(tr \cdot rr \cdot Ar)\} \cdot \{1 - (Lr/L) \cdot Kf\}, \text{ where}$$

W is the sprung mass, h is the height of the center of gravity, tf is the front tread, tr is the rear tread, rf is the front arm ratio, rr is the rear arm ratio, Af is the front sustaining area, Ar is the rear sustaining area, L is the wheel base and Lr is a distance between the rear axle and the center of gravity. The value of Kf is optionally set within a range of $(L/Lr) > Kf > 1.0$, and it represents a load allotment ratio for the front wheels. When Kf equals to 1.0, the share of the load at the front is 50%. By optionally setting the value of Kf, the steering characteristic of the vehicle can be adjusted.

In order to avoid the repetition of minor adjustments due to a fluctuation of calculated values, detection errors, noises, and so on, an insensitive region i is set, whereby, when $-i \leq GRLM \leq i$, the target pressure differences $\Delta PFLM$, $\Delta PFRM$, $\Delta PRLM$ and $\Delta PRRM$ are all set at 0. When the value of coefficients a and b is properly selected, the target pressure differences can be set corresponding to characteristic of suspensions 1FL, 1FR, 1RL and 1RR, high pressure reserve valves 26 and 30, leveling valves 42, 44, 46 and 48, discharge valves 58, 60, 64 and 66. Consequently, functional error by devices is eliminated.

Subsequent step 320 calculates target pressures PFLM, PFRM, PRLM and PRRM according to the following formulas:

$$PFLM = \Delta PFLM + PFLA,$$

$$PFRM = \Delta PFRM + PFRA,$$

$$PRLM = \Delta PRLM + PRLA \text{ and}$$

$$PRRM = \Delta PRRM + PRRA.$$

Thus, the pressure of individual air springs can be fixed at a target value for controlling the vehicle attitude.

Step 330 calculates individual pressure deviations eFL, eFR, eRL and eRR according to the following formulas:

$$eFL = PFLM - PFL,$$

$$eFR = PFRM - PFR,$$

$$eRL = PRLM - PRL \text{ and}$$

$$eRR = PRRM - PRR, \text{ where}$$

PFL, PFR, PRL and PRR are pressure values obtained by filtering the outputs of the pressure sensors 50, 52, 54 and 56 provided for the main air chambers 4FL, 4FR, 4RL and 4RR of suspensions 1FL, 1FR, 1RL and 1RR.

Figure 13:
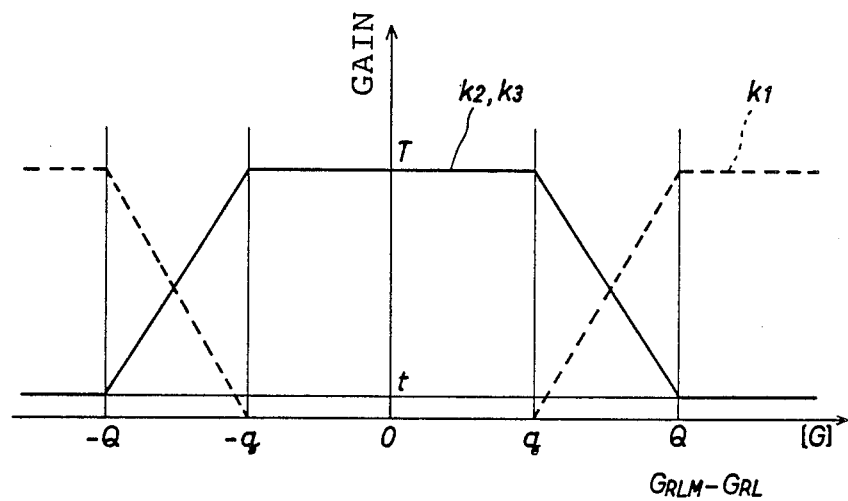
FIG. 13 is a graph for determining feedforward gain k1 and feedback gains k2 and k3 based on the difference between the expected lateral acceleration GRLM and an actual lateral acceleration GRL.

In order to convert the above-mentioned pressure deviations into the control amount, subsequent step 340 calculates feedforward gain k1 representing the share of the feedforward control. The feedforward gain k1 is determined based on the difference between the expected lateral acceleration GRLM and the actual lateral acceleration GRL with reference to the dashed line shown in FIG. 13. As shown in FIG. 13, when the difference |GRLM−GRL| is equal to or smaller than a preset value q, the value of k1 is set at 0. If |GRLM−GRL| is equal to or larger than a preset value Q (larger than q), k1 is set at T. For the range between q and Q, k1 is increased with the increase in |GRLM−GRL|. In the figure, k2 and k3 represent feedback gains which will be described later. If the difference between the expected lateral acceleration GRLM and the current actual lateral acceleration GRL is large, the proportion of feedforward control in the actual control amounts increases.

Step 350 calculates feedforward pressure adjustments c1FL, c1FR, c1RL and c1RR to the respective suspensions 1FL, 1FR, 1RL and 1RR by utilizing the above-mentioned gain k1 and the pressure deviations eFL, eFR, eRL and eRR according to the following formulas:

$$c1FL = k1 \cdot eFL,$$

$$c1FR = k1 \cdot eFR,$$

$$c1RL = k1 \cdot eRL \text{ and}$$

$$c1RR = k1 \cdot eRR.$$

Thus, the feedforward control is executed and the feedforward pressure adjustments c1FL, c1FR, c1RL and c1RR are calculated.

Figure 7:
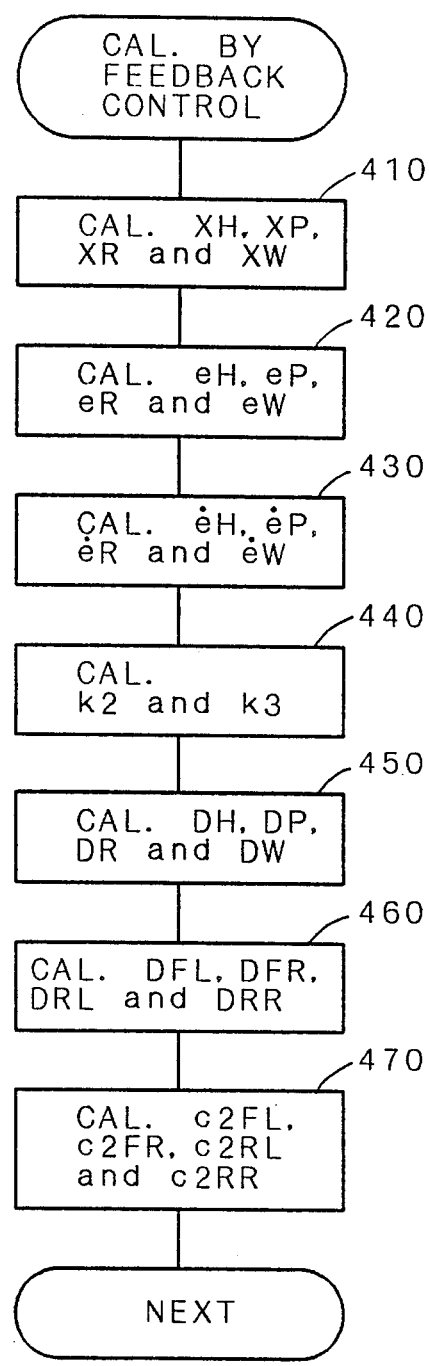
FIG. 7 is a flowchart of a feedback calculation routine.

Now, the feedback control process is explained with reference to the flowchart of FIG. 7. At first, step 410 calculates a vertical translational displacement XH, a pitch displacement XP, a roll displacement XR, and a warp displacement XW of the vehicle body in response to the output values XFL, XFR, XRL and XRR of the vehicle height sensors 80, 82, 84 and 86 provided for the suspensions 1FL, 1FR, 1RL and 1RR according to the following formulas:

$$XH = (XFR + XFL) + (XRR + XRL),$$

$$XP = (XFR + XFL) - (XRR + XRL),$$

$$XR = (XFR - XFL) + (XRR - XRL) \text{ and}$$

$$XW = (XFR - XFL) - (XRR - XRL), \text{ where}$$

XFL represents a front left vehicle height, XFR a front rear vehicle height, XRL a rear left vehicle height and XRR a rear right vehicle height.

Step 420 calculates displacement deviations eH, eP, eR and eW for each axis change mode, utilizing the above calculated displacements XH, XP, XR and XW in accordance with the following formulas:

$$eH = XHM - XH,$$

$$eP = XPM - XP,$$

$$eR = XRM - XR \text{ and}$$

$$eW = XWM - XW, \text{ where}$$

Figure 14:
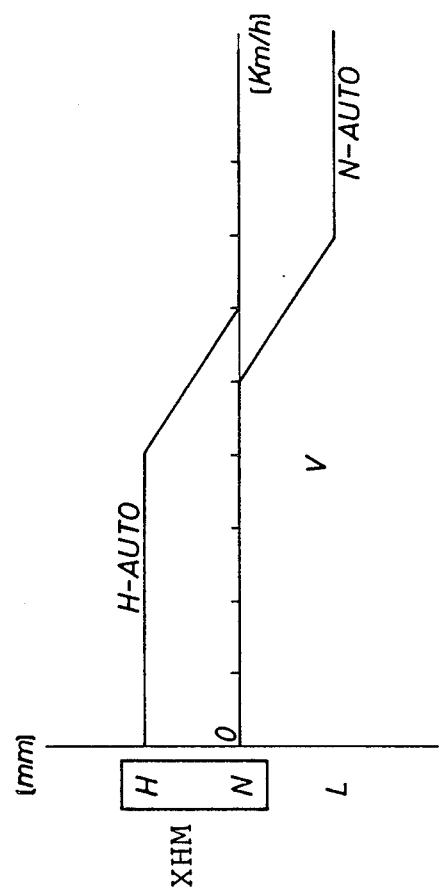
FIG. 14 is a graph for determining a target vertical translational displacement XHM based on the vehicle speed V and a vehicle height mode.
Figure 15:
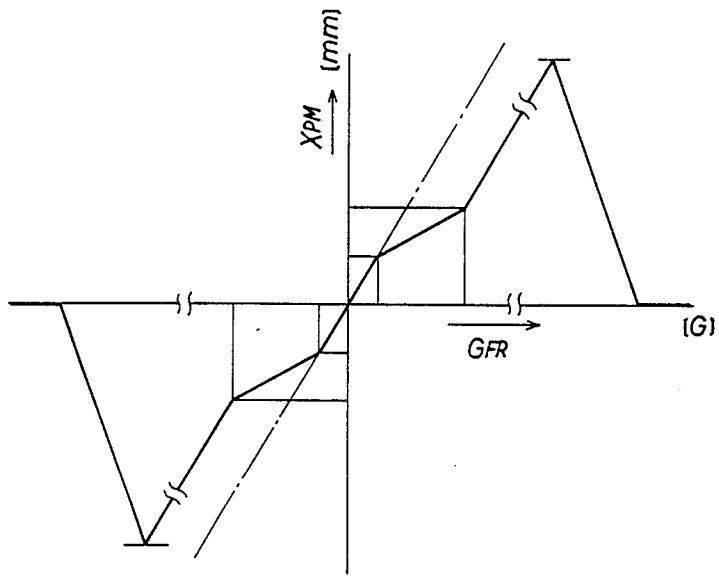
FIG. 15 is a graph for determining a target pitch displacement XPM from an actual longitudinal acceleration GFR.
Figure 16:
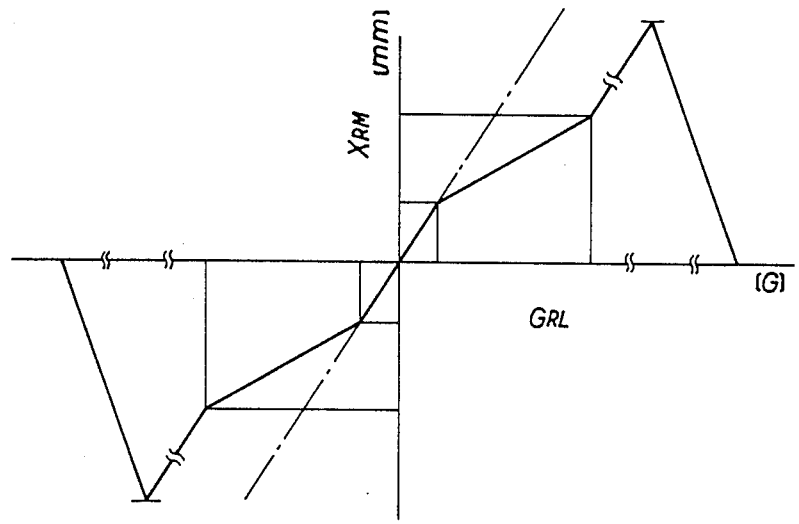
FIG. 16 is a graph for determining a target roll displacement XRM based on the actual lateral acceleration GRL.
Figure 17:
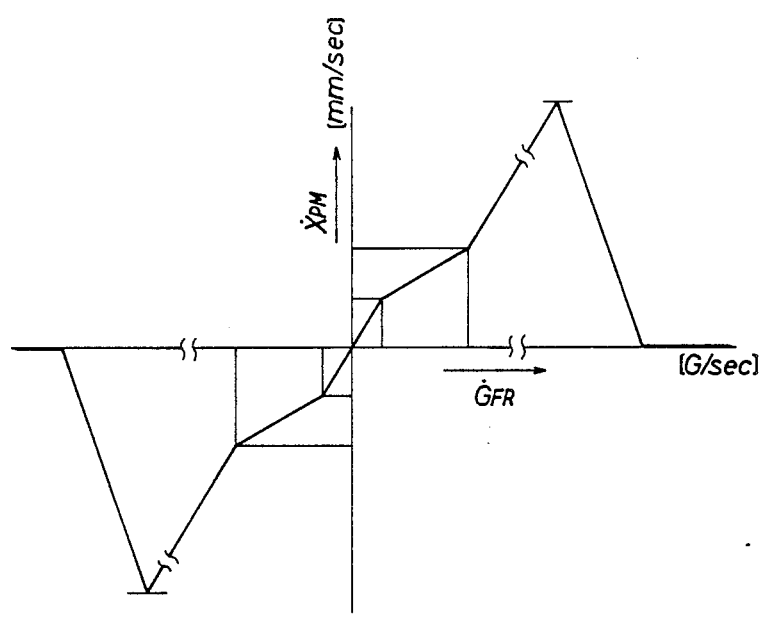
FIG. 17 is a graph for determining a target pitch displacement speed $\dot{X}PM$ based on the actual longitudinal accelerating rate $\dot{G}FR$.
Figure 18:
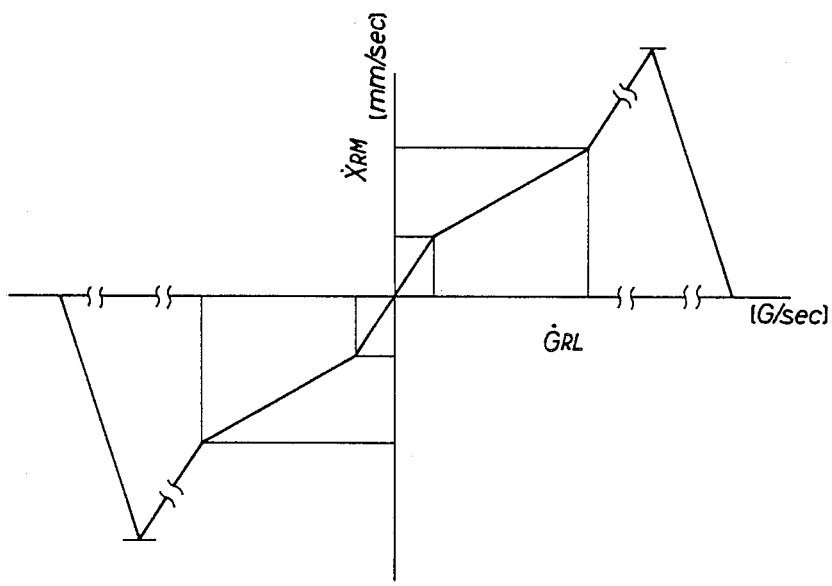
FIG. 18 is a graph for determining a target roll displacement speed $\dot{X}RM$ based on an actual lateral accelerating rate $\dot{G}RL$.
Figure 19:
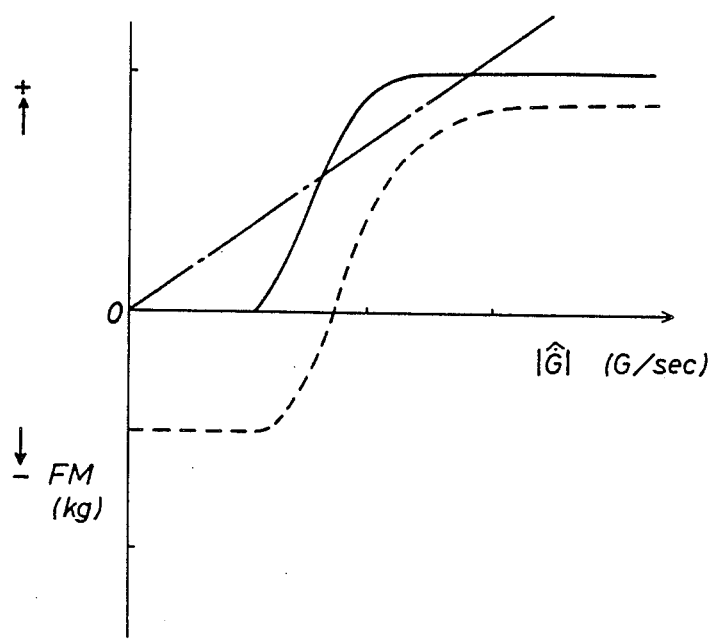
FIG. 19 is a graph for determining a target roll stiffness distribution FM from an estimated accelerating rate $|\hat{G}|$.

XHM represents a target vertical translational displacement which is determined from the vehicle speed V and a mode (H-AUTO or N-AUTO) selected by the high switch 97 or the low switch 98 as shown in the graph of FIG. 14. XPM is a target pitch displacement which is determined from the actual longitudinal acceleration GFR detected by the acceleration sensor 92 based on the graph of FIG. 15. XRM a target roll displacement which is determined from the actual lateral acceleration GRL based on the graph of FIG. 16. XWM is a target warp displacement which is normally set at 0.

Step 430 calculates speed deviations $\dot{X}H$, $\dot{e}P$, $\dot{e}R$ and $\dot{e}W$ for each mode by utilizing differentials $\dot{X}H$, $\dot{X}P$, $\dot{X}R$ and $\dot{X}W$ of the above-mentioned displacements XH, XP, XR and XW in accordance with the following formulas. The above-mentioned $\dot{X}H$, $\dot{X}P$, $\dot{X}R$ and $\dot{X}W$ may be replaced with the respective differences of XH, XP, XR and XW during a predetermined short period.

$$\dot{e}H = \dot{X}HM - \dot{X}H,$$

$$\dot{e}P = \dot{X}PM - \dot{X}P,$$

$$\dot{e}R = \dot{X}RM - \dot{X}R \text{ and}$$

$$\dot{e}W = \dot{X}WM - \dot{X}W, \text{ where}$$

$\dot{X}HM$ represents a target vertical translational displacement speed which is normally set at 0. $\dot{X}PM$ is a target pitch displacement speed which is determined from the actual longitudinal accelerating rate $\dot{G}FR$ based on the graph of FIG. 17, $\dot{X}RM$ is a target roll displacement speed which is determined from the actual lateral accelerating rate based on the graph of FIG. 18. $\dot{X}WM$ is a target warp displacement speed which is normally set at 0.

Subsequent step 440 calculates feedback gains k2H, k2P, k2R and k2W (which are represented by k2) and k3H, k3P, k3R and k3W (represented by k3) to convert the above-mentioned individual displacements into the control amounts. With reference to the solid line in the graph of FIG. 13, the gains k2 and k3 are determined in response to the difference between the expected lateral acceleration GRLM and the actual lateral acceleration GRL. When the difference |GRLM−GRL| is equal to or smaller than the preset value q, k2 and k3 are set at T. If equal to or larger than the preset value Q, k2 and k3 are set at a small value t. For the range between q and Q, k2 and k3 decrease with the increase in |GRLM−GRL|. Accordingly, if the difference between the expected lateral acceleration GRLM and the actual lateral acceleration GRL is small, the share of the feedback control in the actual control amount is increased because the attitude of the vehicle body is assumed to be stable.

Step 450 calculates feedback amounts DH, DP, DR and DW for each mode based on the deviations eH, eP, eR and eW and the speed deviations $\dot{e}H$, $\dot{e}P$, $\dot{e}R$ and $\dot{e}W$ in accordance with the following formulas:

$$DH = k2H \cdot eH + k3H \cdot \dot{e}H + k4H,$$

$$DP = k2P \cdot eP + k3P \cdot \dot{e}P + k4P,$$

-continued
$$DR = k2R \cdot eR + k3R \cdot eR + k4R \text{ and}$$

$$DW = k2W \cdot eW + k3W \cdot eW + k4W, \text{ where}$$

k2H, k2P, k2R, k2W, k3H, k3P, k3R and k3W are constants determined by taking account of the responsiveness of the system (e.g., k2H, k2P, k2R, k2W =0.5; k3H, k3P, k3R, k3W =0.3). k4H, k4P, k4R and k4W are also preset constants for compensating for hardware configuration of the system (e.g., the difference in the length of the air pipes between left and right or between front and rear), and may be all set at 0.

Subsequent step 460 calculates feedback amounts DFL, DFR, DRL and DRR of the suspensions 1FL, 1FR, 1RL and 1RR by utilizing the above-mentioned feedback amounts DH, DP, DR and DW for the individual axis change modes with the following formulas:

$$DFL = (\tfrac{1}{4})(kOH \cdot DH + 2kOP \cdot Lf \cdot DP - kOR \cdot DR - kOW \cdot DW),$$

$$DFR = (\tfrac{1}{4})(kOH \cdot DH + 2kOP \cdot Lf \cdot DP + kOR \cdot DR + kOW \cdot DW),$$

$$DRL = (\tfrac{1}{4})(kOH \cdot DH - 2kOP \cdot (1 - Lf) \cdot DP - kOR \cdot DR + KOW \cdot DW)$$

and $$DRR = (\tfrac{1}{4})(kOH \cdot DH - 2kOP \cdot (1 - Lf) \cdot DP + kOR \cdot DR - kOW \cdot DW)$$

where kOH, kOP, kOR and kOW are control gains for heave (translational movement), pitch, roll and warp, respectively, and are determined from design policy. When kOP and kOR are set at larger values, pitch and roll can be suppressed but in usual cases they may be all set at 1. Lf represents a load allotment ratio between the front and rear axles determined by considering the position of the center of gravity within the wheel base.

Step 470 calculates feedback pressure adjustments c2FL, c2FR, c2RL and c2RR by utilizing the above-mentioned feedback amounts DFL, DFR, DRL and DRR in accordance with the following formulas:

$$c2FL = PFL \cdot a2FL \cdot DFL,$$

$$c2FR = PFR \cdot a2FR \cdot DFR,$$

$$c2RL = PRL \cdot a2RL \cdot DRL \text{ and}$$

$$c2RR = PRR \cdot a2RR \cdot DRR, \text{ where}$$

PFL, PFR, PRL and PRR are obtained by filtering the outputs of the pressure sensors 50, 52, 54 and 56 installed in the main air chambers 4FL, 4FR, 4RL and 4RR of the suspensions 1FL, 1FR, 1RL and 1RR. a2FL, a2FR, a2RL and a2RR are predetermined coefficients.

Thus, the feedback control process is executed and the feedback pressure adjustments c2FL, c2FR, c2RL and c2RR are calculated.

Figure 8A:
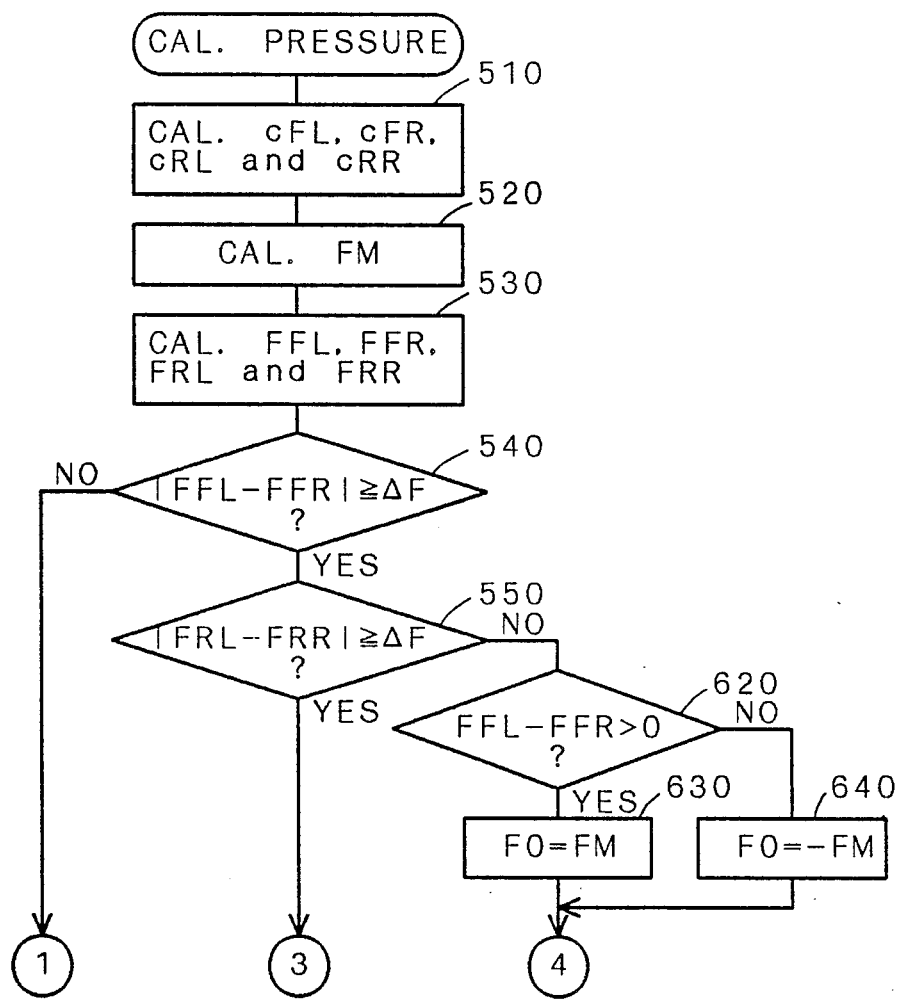
FIGS. 8A, 8B and 8C are flowcharts of a total pressure adjustment calculation routine.
Figure 8B:
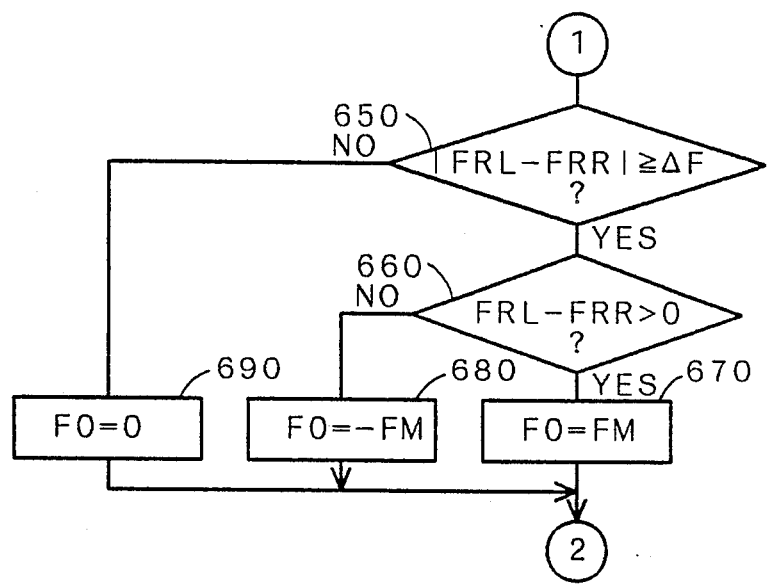
Figure 8C:
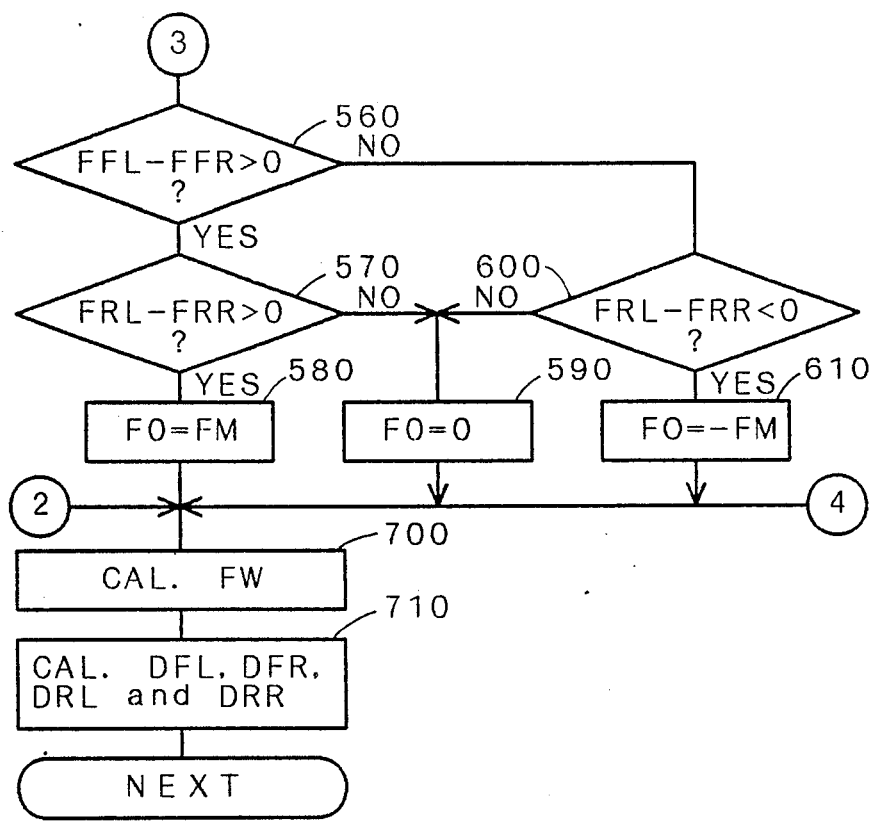

Subsequently, pressure calculation is explained with reference to FIGS. 8A, 8B and 8C. Step 510 calculates total pressure adjustments cFL, cFR, cRL, cRR by adding the feedforward pressure adjustments c1FL, c1FR, c1RL and c1RR and the feedback pressure adjustments c2FL, c2FR, c2RL and c2RR, as follows:

$$cFL = c1FL + c2FL,$$

$$cFR = c1FR + c2FR,$$

$$cRL = c1RL + c2RL \text{ and}$$

$$cRR = c1RR + c2RR.$$

Subsequent step 520 calculates target roll stiffness distribution FM from the estimated lateral accelerating rate GRL calculated at step 290 according to the formula below:

$$FM = KRH \cdot |GRL|, \text{ where}$$

KRH is a coefficient of roll distribution to front wheels. The coefficient KRH is preset by experiments and so on. The target roll stiffness distribution FM can be obtained in accordance with a map in FIG. 19, where a dashed line plots the above formula. As shown by solid or broken line in FIG. 19, while vehicle corners steadily without variations in lateral acceleration, the target roll stiffness distribution FM can be set properly to 0 or −50, according to classification of a vehicle, for example, a Sports Car or Sedan.

The target roll stiffness distribution FM can be calculated using the actual lateral accelerating rate $\dot{G}RL$ which is a differential or a difference caused for a predetermined time period of the actual lateral acceleration GRL detected by the acceleration sensor 92, instead of using the estimated lateral accelerating rate $\dot{G}RL$. The target roll stiffness distribution FM can also be calculated from change rate of yaw rate. However, the target roll stiffness distribution FM should represent a cornering state of the vehicle from when the vehicle running straightforward is steered to corner until the vehicle corners steadily without change in lateral acceleration.

Next, step 530 calculates suspension forces FFL, FFR, FRL and FRR as loads applied to the air springs 2FL, 2FR, 2RL and 2RR responsive to instantaneous values PFL, PFR, PRL and PRR. The values PFL, PFR, PRL and PRR are the filtered values of output from the pressure sensors 50, 52, 54 and 56 provided for the main air chambers 4FL, 4FR, 4RL and 4RR of the suspensions 1FL, 1FR, 1RL and 1RR. The filtering constant IF is 256.

$$FFL = Af \cdot lf \cdot PFL,$$

$$FFR = Af \cdot lf \cdot PFR,$$

$$FRL = Ar \cdot lr \cdot PRL \text{ and}$$

$$FRR = Ar \cdot lr \cdot PRR, \text{ where}$$

Af represents the sustaining area of the air springs 2FL and 2FR of the front suspensions 1FL and 1FR, Ar the sustaining area of the air springs 2RL and 2RR of the rear suspensions 1RL and 1RR, lf an arm ratio of the mounting position of the front air springs, and lr an arm ratio of the mounting position of the rear air springs. The suspension forces FFL, FFR, FRL and FRR can be detected by a load sensor such as a load cell provided between the vehicle body and the air springs 2FL, 2FR, 2RL and 2RR, respectively, instead of the pressure sensors 50, 52, 54 and 56.

Subsequently, it is determined at step 540 that an absolute value of the difference between the front left suspension force FFL and the front right suspension force FFR is equal to or more than a guarded value of preset torsional force ΔF (|FFL−FFR| ≧ ΔF). At subsequent step 550, it is determined whether an absolute value of the difference between the rear left suspension force FRL and the rear right suspension force FRR is equal to or more than the guarded value of preset torsional force ΔF (|FRL−FRR| ≧ F). Then, the torsional force equal to or larger than the guarded value ΔF is applied to both the front and rear wheels.

When the answer at the steps 540 and 550 is YES, step 560 determines whether or not the difference between the front left suspension force FFL and front right suspension force FFR is larger than zero (FFL−FFR>0). If YES, it is determined at step 570 whether or not the difference between the rear left suspension force FRL and the rear right suspension force FRR is larger than zero (FRL−FRR>0). If YES again, the front and rear left suspension forces FFL and FRL are larger than the front and rear right suspension forces FFR and FRR respectively. Then, it is assumed the vehicle is cornering clockwise with the left wheels thereof functioning as outer wheels. At step 580, the target roll stiffness distribution FM is substituted for stiffness distribution FO (FO=FM).

When the answer at the step 570 is NO, the front left suspension force FFL is larger than the front right force FFR and the rear right suspension force FRR is larger than the rear left force FRL. As a result, the torsional force in the direction opposite to the rear wheels is applied to the front wheels. Then at step 590, zero is substituted for the stiffness distribution FO (FO=0). Accordingly, the torsional force is removed prior to the changing of the roll stiffness distribution.

On the other hand, when the answer is NO at step 560, it is determined at step 600 whether or not the difference between the rear left suspension force FRL and the rear right suspension force FRR is smaller than zero (FRL−FRR<0). If YES, the front and rear right suspension forces FFR and FRR are larger than the front and rear left suspension forces FFL and FRL, respectively. Thereby, the vehicle is determined to being cornering counterclockwise with the right wheels thereof functioning as outer wheels. At subsequent step 610 a negative value of the aforementioned target roll stiffness distribution −FM is substituted for the stiffness distribution FO (FO=−FM). Alternatively, if the answer at step 600 is NO, the right force FFR is larger than the left force FFL at the front wheels, and the left force FRL is larger than the right force FRR at the rear wheels. Namely, a torsional force is applied on the vehicle body. Subsequent step 590 substitutes zero for the stiffness distribution FO (FO=0). Consequently, the control of eliminating the torsional force is executed prior to that of changing the roll stiffness distribution.

Moreover, when the answer at the step 550 is NO, the torsional force equal to or larger than the guarded value thereof ΔF is applied to only the front wheels, not to the rear wheels. Subsequently, it is determined at step 620 whether the difference between the front left suspension force FFL and the front right suspension force FFR is larger than zero (FFL−FR>0). Specifically, if the front left suspension force FFL is larger than FFR, it is determined that the vehicle is cornering clockwise with the left wheels thereof functioning as outer wheels. As a result, step 630 substitutes the above target roll stiffness distribution FM for the stiffness distribution FO (FO=FM). On the other hand, when the answer at the step 620 is NO, the front right suspension force FFR is larger than FFL that the vehicle is determined to being cornering counterclockwise with the right wheels thereof functioning as outer wheels. Then, step 640 substitutes the negative value of the target roll stiffness distribution −FM for the stiffness distribution FO (FO=−FM).

When the answer is NO at step 540, a large torsional force is not generated on the front wheels, but acts on the rear wheels. Subsequently, it is determined at step 650 in the same way at step 550 whether the absolute value of the difference between the rear left suspension force FRL and the rear right suspension force FRR is equal to or larger than the guarded value of the preset torsional force ΔF (|FRL−FRR| ≧ ΔF). The procedure goes to the step 660 at which it is determined whether or not the difference between the rear left suspension force FRL and the rear right suspension force FRR is larger than zero (FRL−FRR>0). If the answer is YES, namely, when the rear left suspension force FRL is larger than FRR, it is determined that the vehicle is cornering clockwise with the left wheels thereof functioning as outer wheels. Subsequent step 670 substitutes the aforementioned target roll stiffness distribution FM for the stiffness distribution FO (FO=FM). On the other hand, when the answer is NO at step 660, that is, when the rear right suspension force FRR is larger than FRL, the vehicle is determined to be cornering counterclockwise with the right wheels thereof functioning as outer wheels. Subsequent step 680 substitutes the negative value of the target roll stiffness distribution −FM for the stiffness distribution FO (FO=−FM).

Moreover, when the answer is NO at step 650, namely, when the suspension forces FFL, FFR, FRL and FRR are almost the same and the vehicle is running straightforward, zero is substituted for the stiffness distribution FO at step 690.

Subsequently, step 700 calculates torsional force FW, i.e., torsional load applied to the vehicle from the above suspension forces FFL, FFR, FRL and FRR according to the formula below:

$$FW = (FFL-FFR)-(FRL-FRR)$$

Instead of the torsional force FW, a torsional distribution ratio CFW can be calculated as follows:

$$CFW = (FFL-FFR)/\{(FFL-FFR)+(FRL-FRR)\}$$

Next, step 710 calculates pressure adjustments DFL, DFR, DRL and DRR for compensating for torsional force, using the total pressure adjustments cFL, cFR, cRL and cRR, the stiffness distribution FO and the torsional force FW as follows:

$$DFL = cFL + KWF(FO - FW),$$

$$DRL = cRL - KWR(FO - FW),$$

$$DFR = cFR - KWF(FO - FW) \text{ and}$$

$$DRR = cRR + KWR(FO - FW), \text{ where}$$

KWF and KWR are coefficients calculated as follows:

$$KWF = \tfrac{1}{4} \cdot 1/Af \cdot If$$

$$KWR = \tfrac{1}{4} \cdot 1/AR \cdot IR$$

The torsional force is shared by four wheels. Therefore, the above formulas use multiplier of ¼ to convert load into pressure.

As set forth hereinbefore, step 530 calculates the suspension forces FFL, FFR, FRL and FRR as loads applied to the air springs 2FL, 2FR, 2RL and 2RR respectively. Based on the calculated forces FFL, FFR, FRL and FRR, step 700 calculates the torsional force FW as the torsional load to the vehicle caused by supplying and discharging air to and from the air springs 2FL, 2FR, 2RL and 2RR. Responsive to the calculated torsional force FW, step 710 modifies the total pressure adjustments cFL, cFR, cRL and cRR to eliminate the torsional force. Subsequently, using the modified total pressure adjustments cFL, cFR, cRL and cRR, i.e., the pressure adjustments DFL, DFR, DRL and DRR, valves are controlled. When the suspension forces FFL, FFR, FRL and FRR exert the torsional force to the vehicle, or when the vehicle is running straightforward, zero is substituted for the stiffness distribution FO. The vehicle torsional force is corrected responsive to the torsional force FW. When it is determined the vehicle is cornering clockwise, the target roll stiffness distribution FM is substituted for the stiffness distribution FO. Thereby, correction is made corresponding to the torsional force FW. At the same time, the front suspensions 1FL and 1FR are controlled to resist rolling of the vehicle. Accordingly, the front laterally moving load increases. The rear suspensions 1RL and 1RR are controlled not to resist rolling of the vehicle. The rear laterally moving load decreases. On the other hand, when the vehicle is determined to corner counterclockwise, the negative value of the target roll stiffness distribution −FM is substituted for FO. Accordingly, pressure is corrected corresponding to the torsional force FW. The front suspensions 1FL and 1FR are controlled to resist the roll of the vehicle. Therefore, the front laterally moving load increases. As for the rear wheels, the rear suspensions 1RL and 1RR are controlled not to resist the vehicle roll. The rear laterally moving load decreases.

As vehicle cornering transient state detection means M3, step 290 calculates the estimated lateral accelerating rate $\dot{G}RL$. Based on the rate $\dot{G}RL$, step 520 calculates the target roll stiffness distribution FM. According to the calculation at steps 530 and 710 as roll stiffness distribution control means, the roll stiffness distribution to the front wheels is controlled to increase corresponding to the target roll stiffness distribution FM. Valves are controlled in response to the pressure adjustments DFL, DFR, DRL and DRR.

Set forth is the explanation of the valve controls for controlling air flow to/from the main air chambers 4FL, 4FR, 4RL and 4RR of the suspensions 1FL, 1FR, 1RL and 1RR. Reference is now made to the flowchart of FIG. 9.

Step 810 calculates VALVE-ON intervals tFL, tFR, tRL and tRR for the high pressure reserve valves 26 and 30, the leveling valves 42, 44, 46 and 48, and the discharge valves 58, 60, 64 and 66 in accordance with the formulas below, in order to adjust the pressures of the main air chambers 4FL, 4FR, 4RL and 4RR based on the above-calculated pressure adjustments DFL, DFR, DRL and DRR for compensating for torsional force.

When the high pressure reserve valves 26 and 30 and the leveling valves 42, 44, 46 and 48 are energized, namely, when the pressures are increasing, $tFL = (aF/\phi) \cdot (DFL/PFH)$, $tFR = (aF/\phi) \cdot (DFR/PFH)$, $tRL = (aR/\phi) \cdot (DRL/PRH)$ and $tRR = (aR/\phi) \cdot (DRR/PRH)$;

When the discharge valves 58, 60, 64 and 66 are energized, namely, the pressures are decreasing, $tFL = (bF/\phi) \cdot (DFL/PFL)$, $tFR = (bF/\phi) \cdot (DFR/PFR)$, $tRL = (bR/\phi) \cdot (DRL/PRL)$ and $tRR = (bR/\phi) \cdot (DRR/PRR)$.

Figure 20:
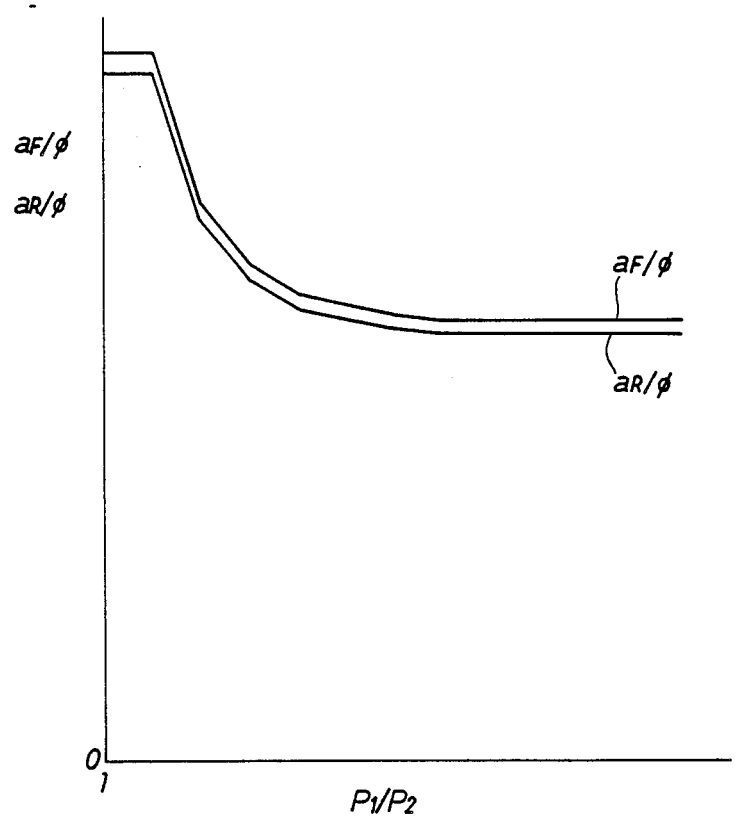
FIG. 20 is a graph for determining coefficients aF/φ and aR/φ based on a ratio P1/P2, i.e., the ratio of a high pressure tank pressure P1 to a pressure P2 of a main air chamber receiving air from the high pressure tank.
Figure 21:
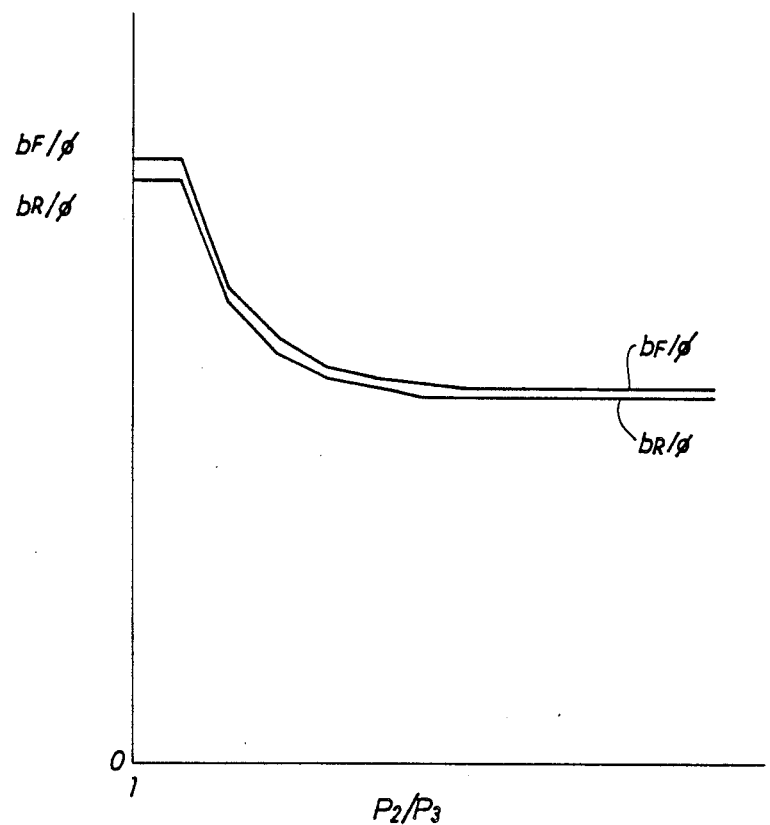
FIG. 21 is a graph for determining coefficients bF/φ and bR/φ based on a ratio P2/P3, i.e., a ratio of the main air chamber pressure P2 to a pressure P3 of a low pressure tank receiving air discharged from the main air chamber.

In the above formulas, $aF/\phi$ and $aR/\phi$ are determined from a ratio P1/P2, i.e., the ratio of the high pressure tank pressure P1(=PFH or PRH) to the pressure P2 of the main air chambers receiving the air from the high pressure reserve tank, with reference to the graph of FIG. 20. The high pressure tank is the front high pressure reserve tank 28 or the rear high pressure reserve tank 32. The above-mentioned pressures PFH and PRH respectively indicate the pressures of the tanks 28 and 32. In the similar manner, $bF/\phi$ and $bR/\phi$ are determined from a ratio P2/P3, i.e., the ratio of the main air chamber pressure P2 to the pressure P3 of the low pressure tank receiving the air discharged from the main air chambers, with reference to the graph of FIG. 21. The low pressure tank is the front low pressure reserve tank 62 or the rear low pressure reserve tank 68.

Subsequently, at step 820, correction of the VALVE-ON interval is executed. Namely, actual valve energizing time intervals tFLU, tFRU, tRLU and tRRU (tFLD, tFRD, tRLD and tRRD) are calculated from the VALVE-ON intervals tFL, tFR, tRL and tRR according to the following formulas.

When the high pressure reserve valves 26 and 30 and the leveling valves 42, 44, 46 and 48 are energized, namely, when the pressures are increasing, $tFLU = \alpha F \cdot tFL + \beta FL$, $tFRU = \alpha F \cdot tFR + \beta FR$, $tRLU = \alpha R \cdot tRL + \beta RL$ and $tRRU = \alpha R \cdot tRR + \beta RR$.

When the discharge valves 58, 60, 64 and 66 are energized, namely, when the pressures are decreasing, $tFLD = \alpha F \cdot tFL + \alpha FL$, $tFRD = \alpha F \cdot tFR + \alpha FR$, $tRLD = \alpha R \cdot tRL + \alpha RL$ and $tRRD = \alpha R \cdot tRR + \alpha RR$.

In the above formulas, $\alpha F$, $\gamma F$, $\alpha R$, $\gamma R$ are coefficients determined by taking following factors into account: valve characteristics, length of pipes, environmental temperature of the valves (e.g., engine room temperature), etc. They may be all set at 1. $\beta$FL, $\beta$FR, $\beta$RL, $\beta$RR, $\gamma$FL, $\gamma$FR, $\gamma$RL and $\gamma$RR are difference of the time intervals needed to open and close the valves. For example, when a valve needs 30 msec to open and 10 msec to close, those values are set at 20 msec.

Figure 22:
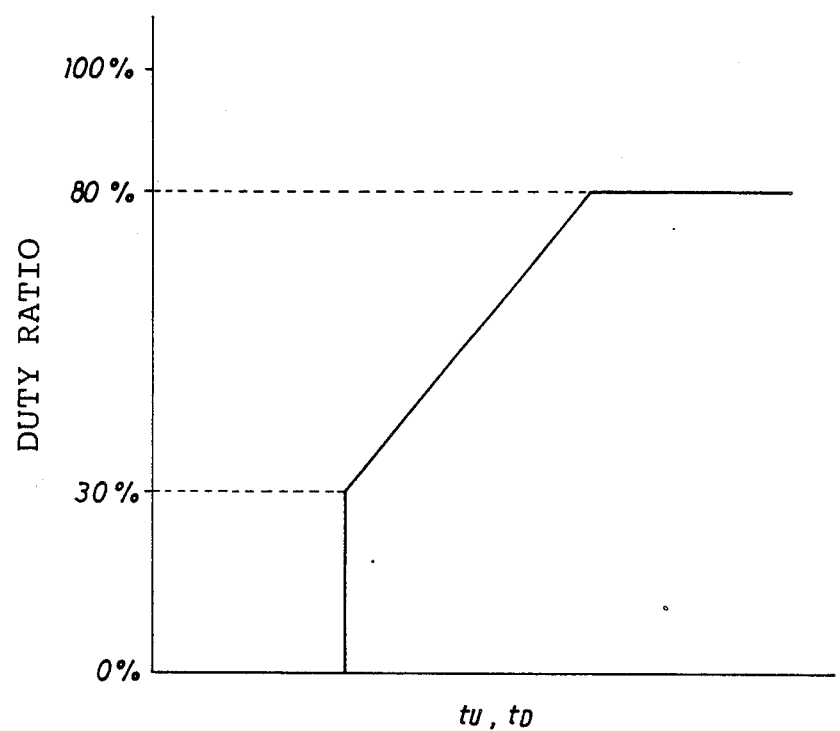
FIG. 22 is a graph for determining a duty ratio based on actual valve energizing time intervals tU and tD.

Step 830 executes guarding of the above-mentioned actual valve energizing time intervals tFLU, tFRU, tRLU and tRRU (represented by tU) and tFLD, tFRD, tRLD and tRRD (represented by tD). The time period required for switching valves on and off is prevented from being reduced too much. The mechanism of the valves is thus protected. As shown in FIG. 22, the actual valve energizing time intervals tU and tD are set to zero when the duty ratio thereof is below 30% after calculation thereof. On the other hand, when the duty ratio of the calculated time periods tU and tD exceeds 80%, the time intervals tU and tD are set corresponding to the duty ratio 80%.

Subsequently, step 840 energizes the valves 26, 30, 42, 44, 46, 48, 58, 60, 64 and 66 during the above-guarded actual valve energizing time intervals tU and tD. The duty ratio indicating the opening time of the valves is set in response to the time intervals tU and tD.

After step 840, the present routine for calculating the air suspension control amount once ends. Upon restarting the above-mentioned calculation routine after the preset time interval, the determination of step 103 is made negative and the program proceeds to step 110. Thereafter, the same processes as the preceding ones resume. In the present embodiment, the valve controlling cycle time interval based on the above-mentioned duty ratio is 100 ms. Namely, the valves 26, 30, 42, 44, 46, 48, 58, 60, 64 and 66 are duty controlled within this 100 ms interval. The valves 26, 30, 42, 44, 46, 48, 58, 60, 64 and 66 are duty controlled every 100 ms according to the latest value of the actual valve energizing time intervals which is determined at 840.

In the present embodiment, the individual target pressures PFLM, PFRM, PRLM and PRRM are repeatedly calculated at every predetermined short time interval. The pressures of the main air chambers 4FL, 4FR, 4RL and 4RR of the suspensions 1FL, 1FR, 1RL and 1RR are controlled at every predetermined time interval in response to the abovementioned target pressures. As a result, smooth control of the pressures corresponding to the actual change during roll can be realized so that ride comfort, maneuverability and stability of the vehicle are improved.

Figure 23A:
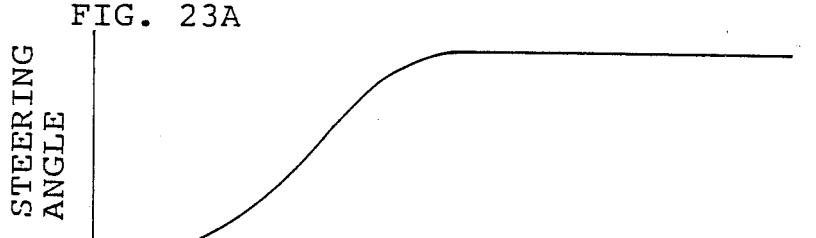
FIGS. 23A, 23B, 23C, 23D and 23E are timing charts indicating the effects of the embodiments.
Figure 23B:
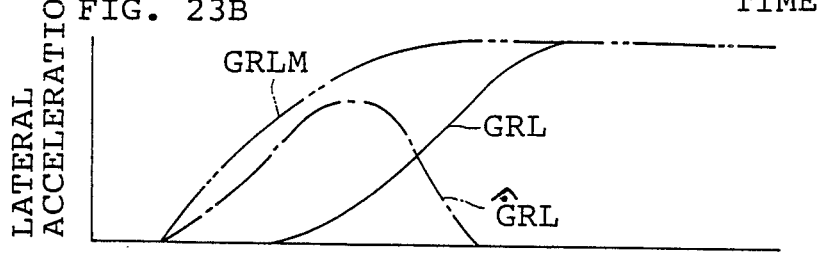
Figure 23C:
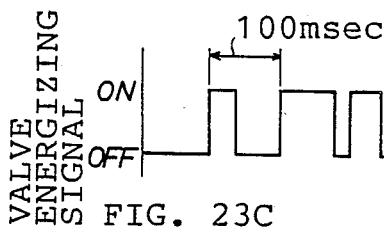
Figure 23D:
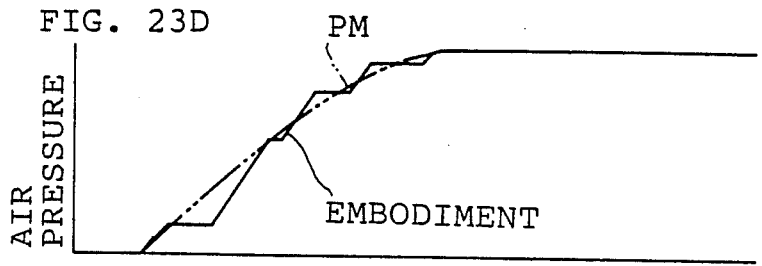
Figure 23E:
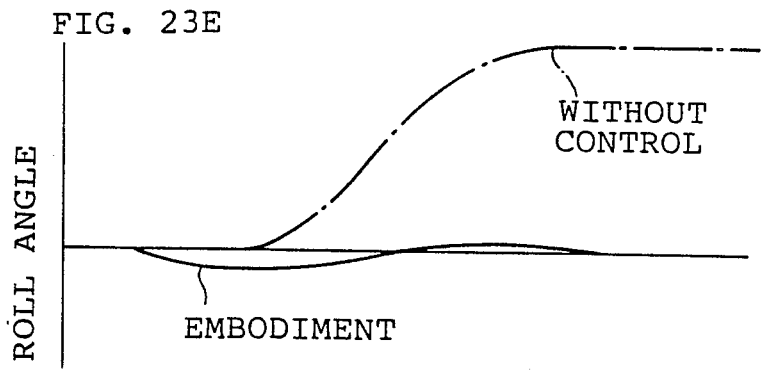

When the steering wheel is gently operated as shown in FIG. 23A, a difference between the expected lateral acceleration GRLM (two-dash chain line) and the actual lateral acceleration GRL (solid line) is as shown in FIG. 23B. FIG. 23C shows that the valve energizing signal is output to an appropriate valve corresponding to the target pressure in a duty cycle time of 100 msec. In FIG. 23D the pressures of the main air chambers 4FL, 4FR, 4RL and 4RR of the suspensions 1FL, 1FR, 1RL and 1RR increases are gradually increased in response to the increase in the expected lateral acceleration GRLM. As a result, the roll angle can be minimized as shown in FIG. 23E so that maneuverability and stability of the vehicle are enhanced.

Alternatively, under feedforward and feedback controls, air is supplied to and discharged from the air suspensions 2FL, 2FR, 2RL and 2RR. When the suspension forces FFL, FFR, FRL and FRR cause torsion on the vehicle, the torsional force FW as a torsional load is calculated. According to the calculation based on the torsional force FW, total pressure adjustments cFL, cFR, cRL and cRR are modified to the pressure adjustments DFL, DFR, DRL and DRR for compensating for the torsion. Accordingly, torsion on the vehicle is removed and driving characteristic is maintained. For example, the friction coefficient does not decrease or steering characteristic does not undergo change.

In this embodiment, both feedforward and feedback controls are carried out. However, as for the system which undergoes only one of the two controls, the aforementioned control can be carried out to eliminate torsion on the vehicle corresponding to the torsional force FW.

Figure 24:
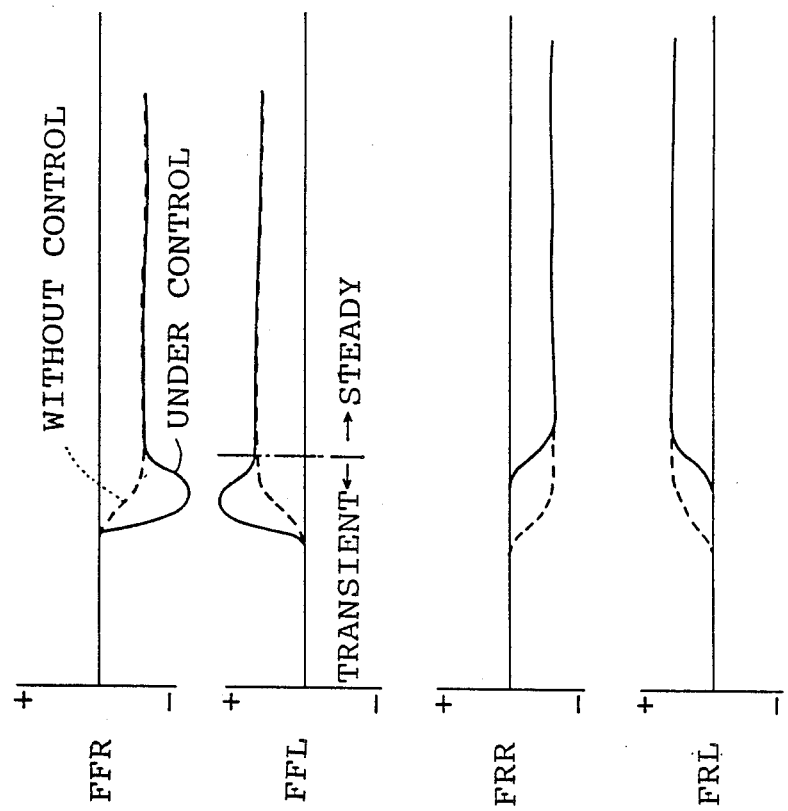
FIGS. 24 is a graph indicating a change in suspension forces FFR, FFL, FRR and FRL with reference to time.

Moreover, in FIG. 23B when the steering wheel 88 is operated and estimated accelerating rate GRL is obtained, the target roll stiffness distribution FM is calculated. Subsequently, when it is determined the vehicle is steered clockwise, the target roll stiffness distribution FM is substituted for the stiffness distribution FO. Thereby, the suspensions 1FL, 1FR, 1RL and 1RR are controlled to resist the roll of the vehicle. Specifically, in FIG. 24 while the vehicle is about to corner, the front right suspension force FFR is controlled to be decreased and the front left suspension force FFL is controlled to be increased, as compared with the suspension forces while the vehicle is steadily cornering. Accordingly, the front laterally moving load becomes larger while the vehicle is about to corner than that while the vehicle is steadily cornering. On the other hand, the rear right suspension force FRR is increased and the rear left suspension force FRL is decreased, as compared with the suspension forces while the vehicle is steadily cornering. Accordingly, the rear laterally moving load becomes less while the vehicle is about to corner than that while the vehicle is steadily cornering. As a result, the steering characteristic turns to under-steering. Alternatively, when it is determined the vehicle is steered to corner couterclockwise, the negative value of target roll stiffness distribution −FM is substituted for the stiffness distribution FO. The suspensions 1FL, 1FR, 1RR and 1RL are controlled to resist the roll of the vehicle, and the front laterally moving load increases while the vehicle is about to corner. On the other hand, the rear laterally moving load decreases and the steering characteristic changes to under-steering. Further, when the estimated lateral accelerating ratio GRL decreases, namely, the vehicle is in steady cornering state, the target roll stiffness distribution FM becomes zero or the predetermined value. The steering characteristic switches to the characteristic under the steady cornering condition.

Figure 25:
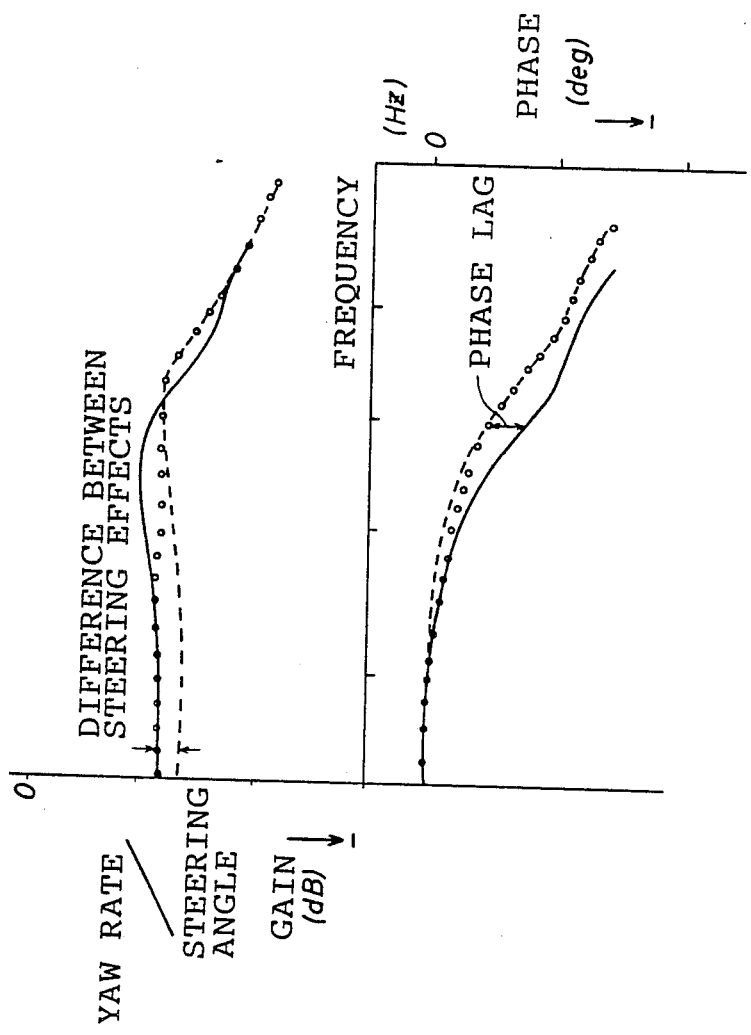
FIG. 25 is a graph showing a variation of a ratio of a yaw rate YR to steering angle MA and a difference in phase between the yaw rate and the steering angle with reference to a frequency.
Figure 26:
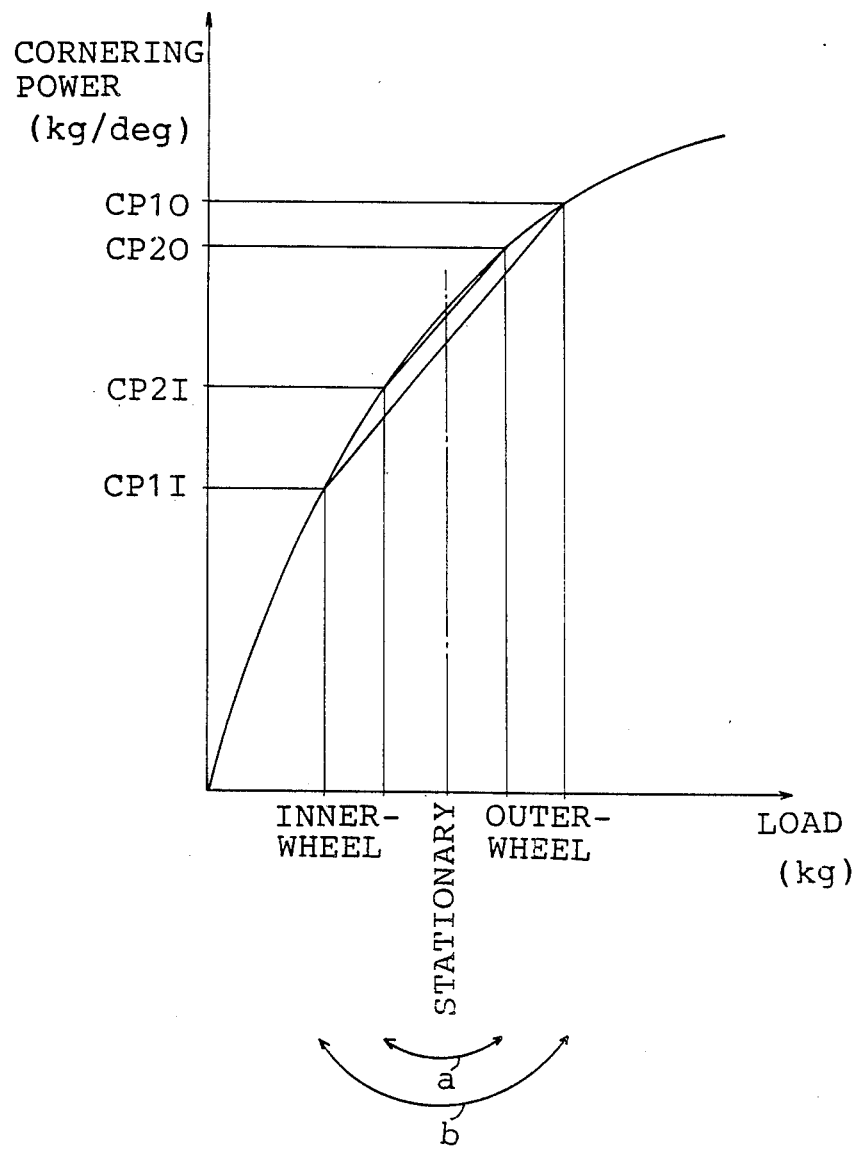
FIG. 26 is a graph showing a relation between the cornering power and load on inner and outer wheels.

Usually when the front suspensions 1FL and 1FR receive the roll of the vehicle, the dynamic characteristic of yaw rate corresponds to the broken line in FIG. 25. In this embodiment, when the vehicle is in a transient state to cornering steadily, the laterally moving load is controlled and the front suspensions 1FL and 1FR receive the roll of the vehicle. As shown by the locus of circles in FIG. 25, the responsiveness of the yaw rate increases, and the quick-responsive steering is accomplished. Subsequently, while the vehicle is cornering steadily, the specified characteristic of the vehicle is fulfilled, for example, the front and rear suspensions 1FL, 1FR, 1RL and 1RR receive the roll of the vehicle as shown by the solid line in FIG. 25. The steering effect can be thus maintained.

Figure 1:
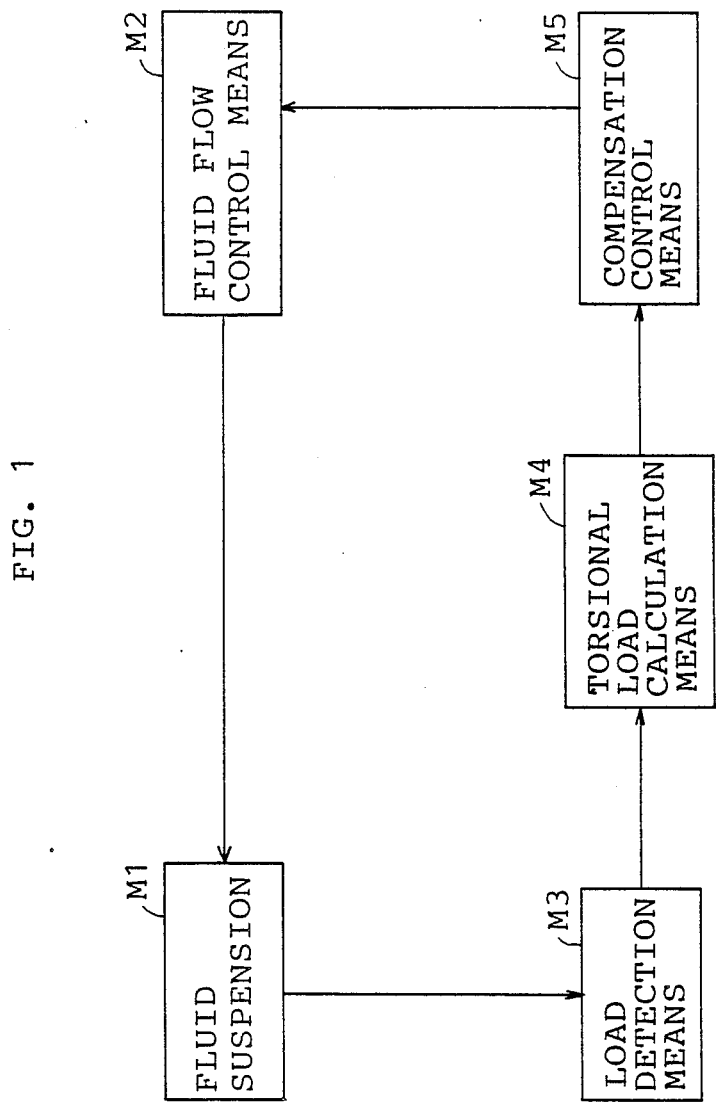
FIG. 1 is a block diagram indicating a fundamental structure of a first embodiment of the present invention.

In the above-explained first embodiment, with reference to FIG. 1, the air circuit AC, steps 103 through 510, and 810 function as the fluid flow control means M2; the pressure sensors 50, 52, 54, 56, and the step 530 function as the load detection means M3; step 700 functions as the torsional load calculation means M4; and steps 540, 550, 560, 570, 600, 590, 710 function as the compensation control means M5.

Hereinafter, another embodiment of the present invention will be explained with reference to the drawings. The embodiment has the same construction as the first embodiment shown in FIGS. 2, 3 and 4.

In the embodiment the expected acceleration GRLM is calculated from the estimated lateral accelerating rate $\dot{GRL}$ in addition to the estimated lateral acceleration GRL. Therefore, the vehicle attitude can be controlled just before the change thereof. Accordingly, more precise feedforward control is realized. The expected lateral acceleration GRLM can be calculated based on the estimated lateral acceleration GRL only or on the estimated lateral accelerating rate $\dot{GRL}$ only. Alternatively, the expected lateral acceleration GRLM can be calculated directly using the actual lateral acceleration GRL, or a differential or a difference thereof, i.e., the actual lateral accelerating rate $\dot{GRL}$.

Figure 27A:
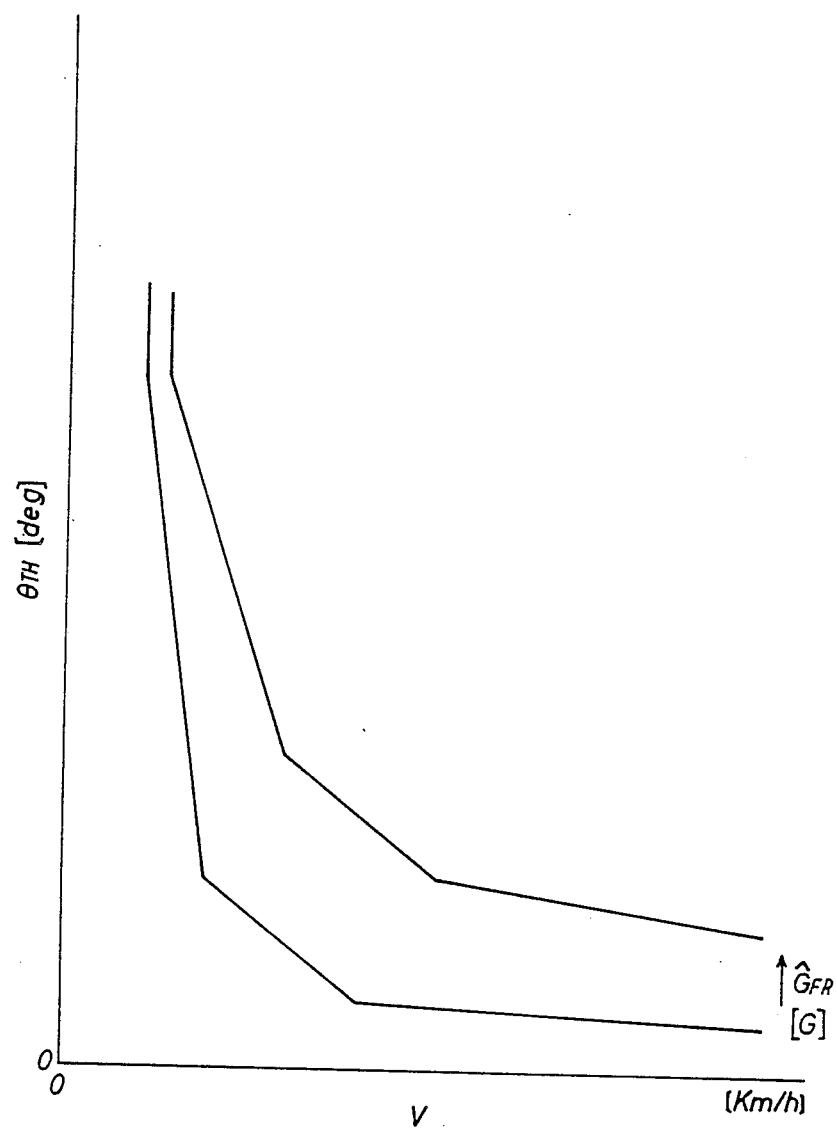
FIG. 27A is a graph for determining an estimated longitudinal acceleration $\hat{G}FR$ based on a throttle opening $\theta TH$ and the vehicle speed V.
Figure 27B:
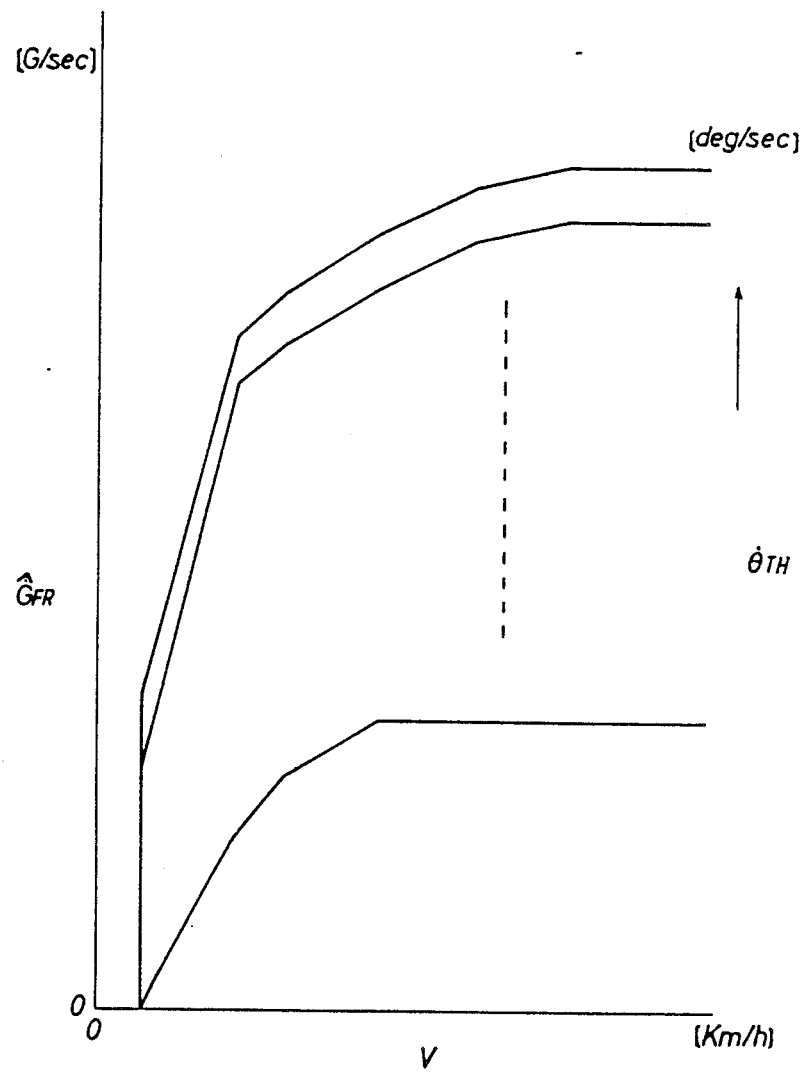
FIG. 27B is a graph for determining an estimated longitudinal accelerating rate GFR from a throttle opening speed $\dot{\theta}TH$ and the vehicle speed V.

In the above embodiment at steps 280 and 290 the estimated lateral acceleration GRL is calculated from the vehicle speed V and the steering angle $\theta$ in accordance with the map in FIG. 10. The estimated lateral accelerating rate $\dot{GRL}$ is calculated from the vehicle speed V and the steering angle speed $\dot{\theta}$ based on the map in FIG. 11. When a longitudinal acceleration is detected instead of the lateral acceleration, the procedures react to the pitch of the vehicle. Specifically, in FIG. 27A an estimated longitudinal acceleration GFR is obtained from the vehicle speed V and a throttle opening $\theta$TH. As shown in FIG. 27B an estimated longitudinal accelerating rate $\dot{GFR}$ is obtained from the vehicle speed V and a throttle opening speed $\dot{\theta}$TH. From the obtained values, an expected longitudinal acceleration GFRM can be calculated. According to the calculation, the vehicle's squatting can be controlled. The throttle opening sensor 96 detects the throttle opening $\theta$TH and the throttle opening speed $\dot{\theta}$TH. The sensor 96 connects with a throttle valve of an engine (not shown) and outputs the signal responsive to the opening of the throttle valve to the electronic control circuit 100.

Figure 28:
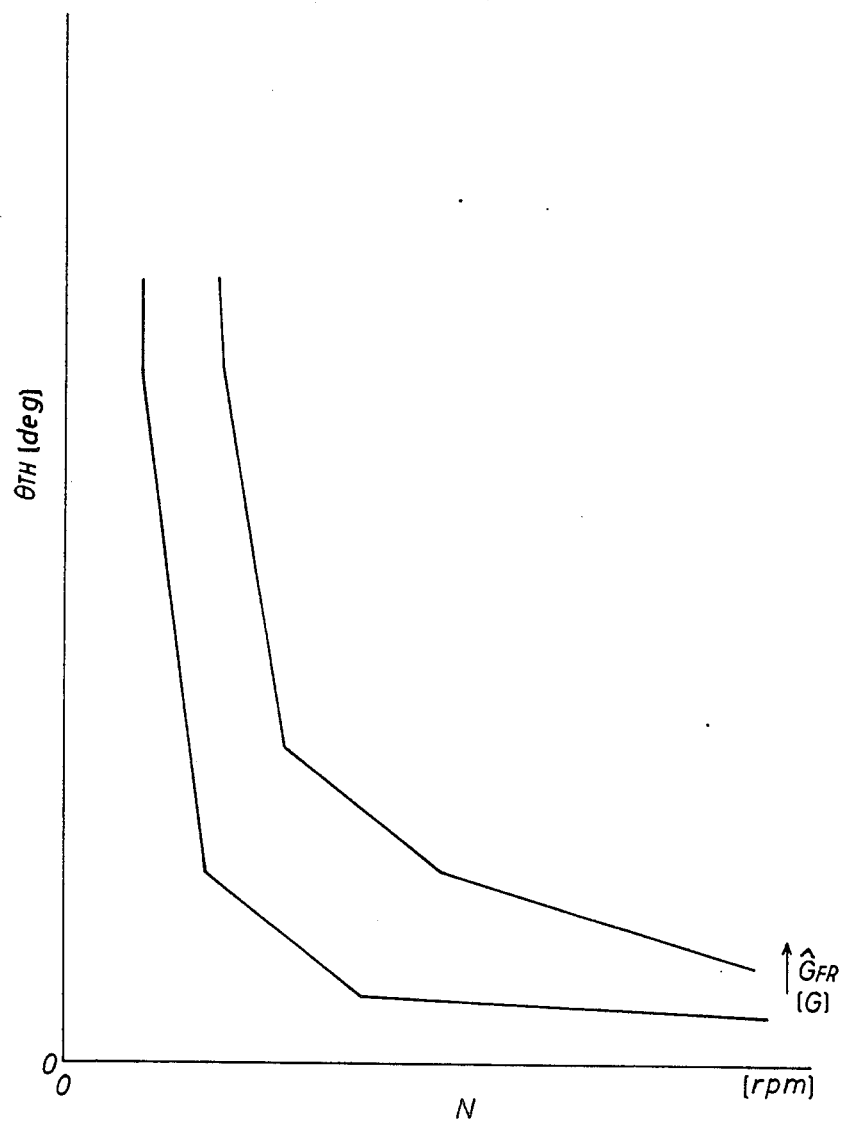
FIG. 28 is a graph for determining an estimated longitudinal acceleration GFR from the throttle opening $\theta TH$ and a revolution speed of engine N.
Figure 29:
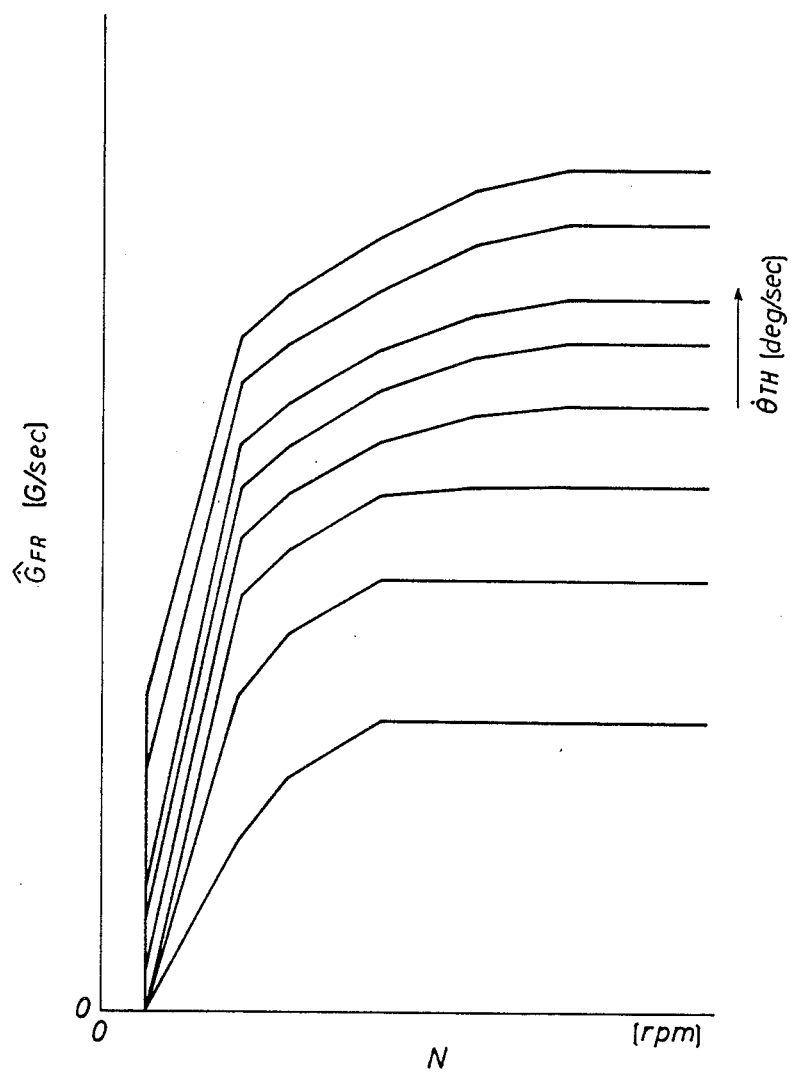
FIG. 29 is a graph for determining an estimated longitudinal accelerating rate GFR from a throttle opening speed $\dot{\theta}TH$ and a revolution speed of engine N.

As another countermeasure against vehicle squat, the estimated longitudinal acceleration $\hat{GFR}$ is obtained from the throttle opening $\theta$TH, and the revolution speed N of the engine instead of the vehicle speed V in accordance with FIG. 28. In FIG. 29 the estimated longitudinal accelerating rate $\dot{GFR}$ is obtained from the revolution speed N and the throttle opening speed $\dot{\theta}$TH. From the estimated longitudinal acceleration $\hat{GFR}$ and the accelerating rate $\dot{GFR}$, the expected longitudinal acceleration GFRM can be calculated in the same way. A revolution speed sensor (not shown) detects the revolution speed N. The revolution speed sensor connects with the crank shaft of the engine (not shown). The sensor outputs the signal responsive to the revolution speed to the electronic control circuit 100.

Figure 30:
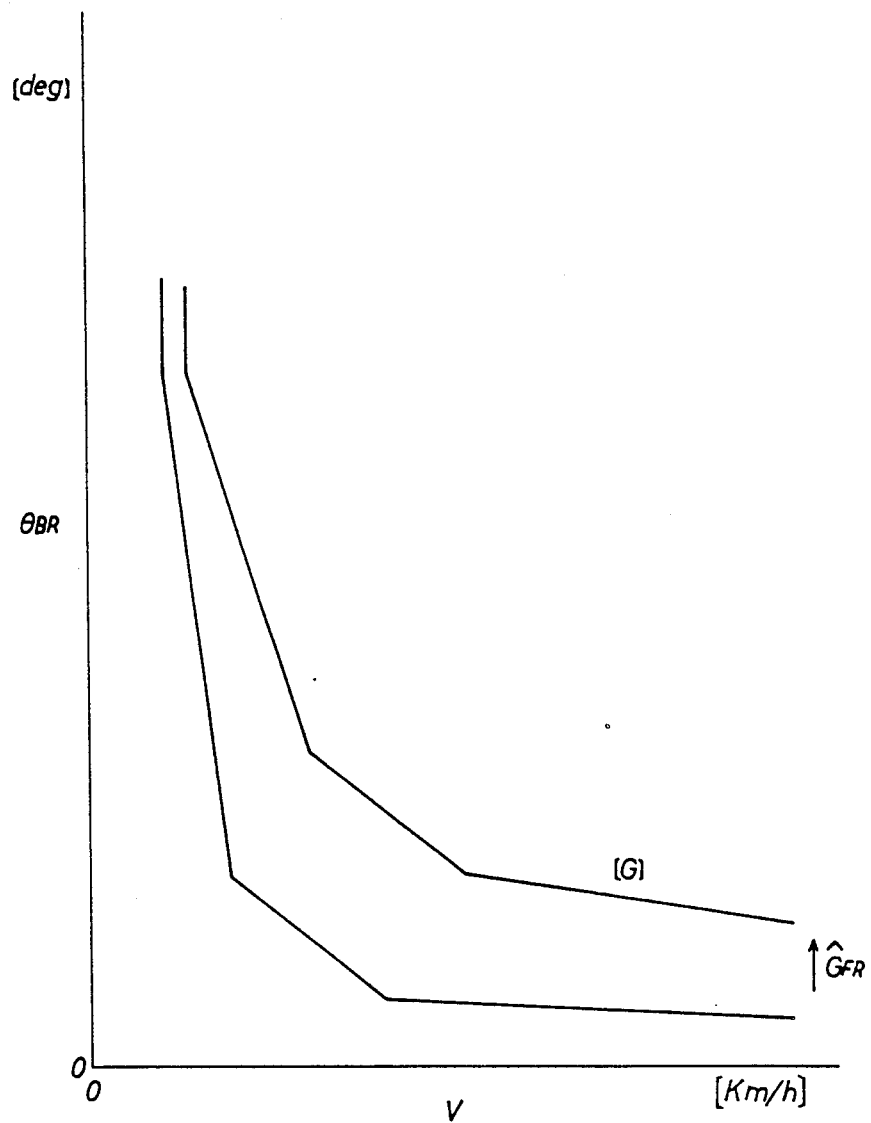
FIG. 30 is a graph for determining an estimated longitudinal acceleration GFR based on a brake pedal displacement $\theta BR$ and a vehicle speed V.
Figure 31:
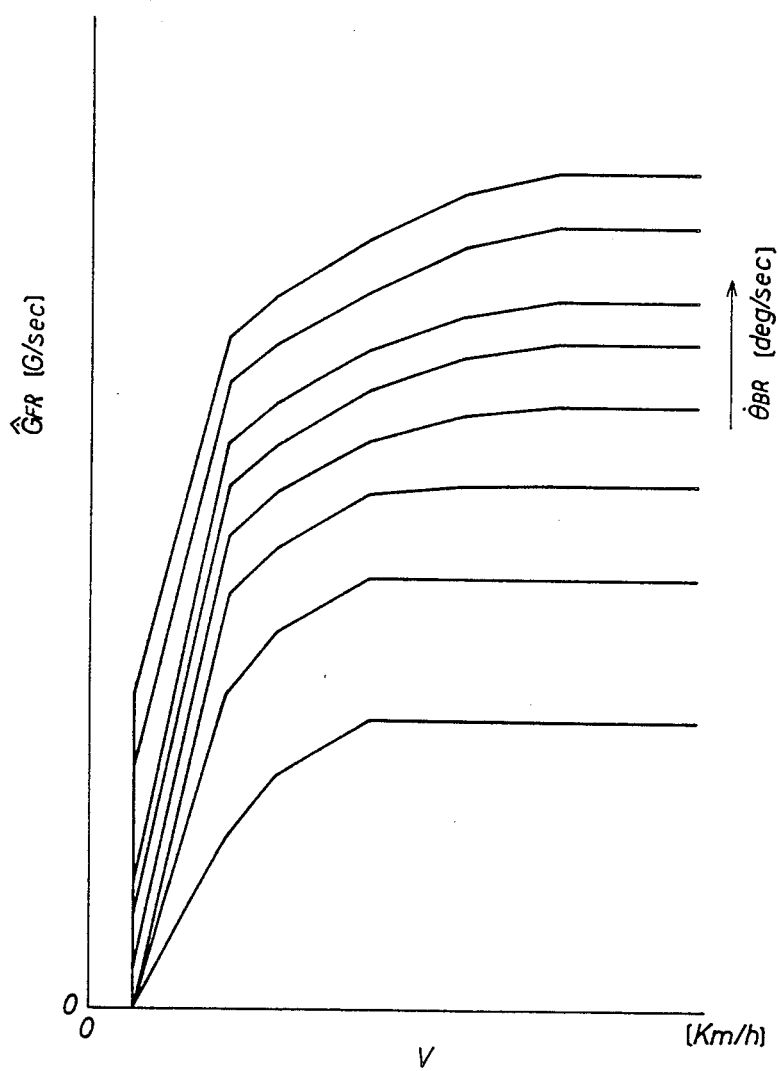
FIG. 31 is a graph for determining an estimated longitudinal accelerating rate $\hat{G}RF$ from the brake pedal operating speed $\theta BR$ and a vehicle speed V.

As a countermeasure for another vehicle's pitch, i.e., dive, instead of the throttle valve opening $\theta$TH and the opening speed $\dot{\theta}$TH, a brake pedal displacement $\theta$BR and the brake pedal operating speed $\dot{\theta}$BR are used. In FIG. 30 the estimated longitudinal acceleration $\hat{GFR}$ is obtained from the vehicle speed V and the brake displacement $\theta$BR. In FIG. 31 the estimated longitudinal accelerating rate $\dot{GFR}$ is obtained from the vehicle speed V and the brake pedal operating speed $\dot{\theta}$BR. From the estimated longitudinal acceleration $\hat{GFR}$ and the accelerating rate $\dot{GFR}$, the expected longitudinal acceleration GFRM can be calculated. A brake pedal displacement sensor (not shown) detects the brake pedal displacement $\theta$BR and the brake pedal operating speed $\dot{\theta}$BR. The displacement sensor connects with a brake pedal. The sensor outputs to the electronic control circuit 100 the signal responsive to the displacement.

The expected longitudinal acceleration GFRM is individually used for squat and dive control respectively. The combination of the expected acceleration GFRM is possible, by which multiple suspension control can be carried out. In the same way as the roll control, when the vehicle begins to squat or dive, excessive control is not executed, but smooth control is carried out. Consequently, the maneuverability and the steering stability are improved. When air is supplied to and discharged from the air springs 2FL, 2FR, 2RL and 2RR to cope with the squat or dive of the vehicle, a torsional force is sometimes applied to the vehicle. The actual torsional force is eliminated, corresponding to the estimated torsional force FW, by correcting the total pressure adjustments cFL, cFR, cRL and cRR. The torsion is thus removed and the driving characteristic is prevented from changing. The combination of the above-calculated expected acceleration GRLM for the roll control and the above-calculated expected acceleration GFRM can execute both the roll and the pitch control.

Figure 32:
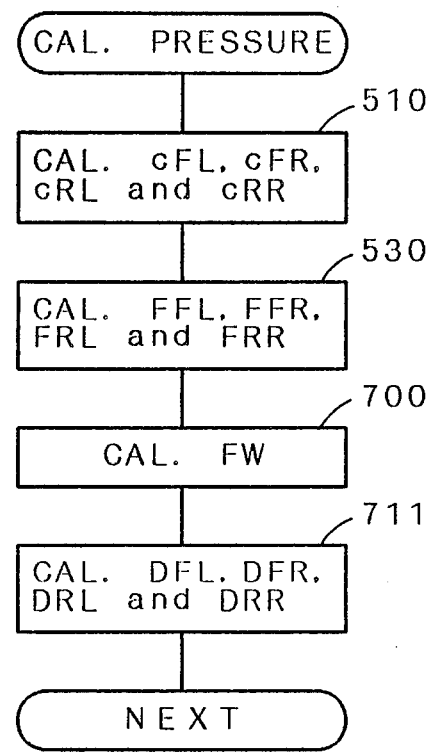
FIG. 32 is a flowchart of total pressure adjustment calculation routine showing a second embodiment of the present invention.
Figure 33:
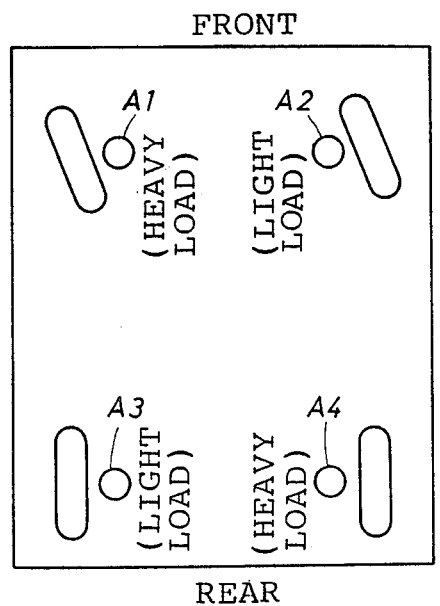
FIG. 33 is a diagram indicating a torsional force applied on a vehicle.

Set forth is the explanation of second embodiment different from that of FIG. 8 with reference to FIG. 32. In the flowchart in FIG. 32, the same process steps as those in the flowchart FIG. 8 are designated by the same step numerals.

First, from the pressures calculated at the procedures of feedforward and feedback controls, the total pressure adjustments cFL, cFR, cRL and cRR are calculated at step 510.

Subsequent step 530 calculates the suspension forces FFL, FFR, FRL and FRR as the load applied to the air springs 2FL, 2FR, 2RL and 2RR. Step 700 calculates the torsional force FW in accordance with the above-mentioned formula.

Subsequent step 711 calculates the pressure adjustments DFL, DFR, DRL and DRR to compensate for the torsional force in response to the torsional force FW using the following formulas:

$$DFL = cFL - KWF \cdot FW,$$

$$DRL = cRL + KWR \cdot FW,$$

$$DFR = cFR + KWF \cdot FW \text{ and}$$

$$DRR = cRR - KWR \cdot FW, \text{ where}$$

KWF and KWR are the coefficients for converting the force into the pressure, which are calculated as follows:

$$KWF = \tfrac{1}{4} \cdot 1/Af \cdot lf$$

$$KWR = \tfrac{1}{4} \cdot 1/AR \cdot lR$$

The torsional force is shared by four wheels. Therefore, the above formulas use multiplier of $\tfrac{1}{4}$.

Figure 9:
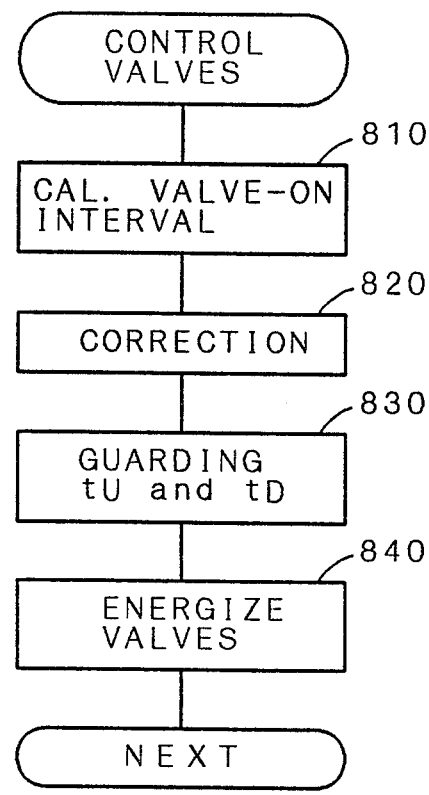
FIG. 9 is a flowchart of a valve control routine.

Subsequently, in FIG. 9, valves are controlled, and the fluid supply and discharge are carried out.

Specifically, after the torsional force FW is calculated, the total pressure adjustments cFL, cFR, cRL and cRR are corrected to eliminate an unbalanced load on the vehicle corresponding to the torsional force FW. In the embodiment the roll stiffness distribution is constant at 50%. Torsion on the vehicle is securely removed by means of simple procedures. The driving characteristic of the vehicle is prevented from changing. When the vehicle squats or dives, the procedures for eliminating torsion from the vehicle can be carried out in the same way as in roll control.

In the present embodiments, the vehicle attitude is controlled by supplying and discharging the air as the working fluid to and from the air springs 2FL, 2FR, 2RL and 2RR using the air circuit AC. Alternatively, the vehicle attitude can be controlled by supplying or discharging the working oil to and from the fluid actuators.

Despite the embodiments thus far described, the present invention should not be limited thereto but can naturally be practiced in various modes without departing from its scope.

What is claimed is:

1. An electronic controlled fluid suspension system comprising:
    a plurality of fluid suspensions, each fluid suspension corresponding to a wheel, with each fluid suspension having a fluid actuator;
    a fluid flow control means for controlling fluid flow to and from the fluid actuator;
    a load detection means for detecting a suspension load applied to each fluid suspension;
    a torsional load calculation means for calculating a torsional load applied to a vehicle, wherein the torsional load is calculated in response to a first load and a second load, where the first load is a first difference between the right front wheel suspension load and the left front wheel suspension load and the second load is a second difference between the right rear wheel suspension load and the left rear wheel suspension load; and
    a compensation control means for determining whether the torsional load is undesired and compensating a control amount for controlling the fluid flow control means to remove the undesired torsional load,
    wherein the compensation control means comprises,
    a first comparing means for comparing the first difference with a first torsional guard load,
    a second comparing means for comparing the second difference with a second torsional guard load,
    a torsional load determination means connected to the first and second comparing means for determining whether the first difference is greater than or equal to the first torsional guard load and whether the second difference is greater than or equal to the second torsional guard load, and
    an undesired torsional load determination means connected to the torsional load determination means for determining that the torsional load is undesired when the first difference is greater than or equal to the first torsional guard load or the second difference is greater than or equal to the second torsional guard load.

2. An electronic controlled fluid suspension system according to claim 1, wherein the fluid flow control means includes:
    means for calculating a total compensation pressure amount for the fluid suspension according to both a feed-back control and a feed-forward control and for compensating the total compensation pressure amount in response to the torsional load.

3. An electronic controlled fluid suspension system according to claim 1 wherein the compensation control means further comprises:
    a torsional direction determination means for determining whether a first direction of the first load applied to a front part of the vehicle is opposite a second direction of the second load applied to a rear part of the vehicle, and
    wherein the undesired torsional load determination means connects to the torsional direction determination means and determines that the torsional load is undesired when the first direction is opposite the second direction.

4. An electronic controlled fluid suspension system comprising:
    a plurality of fluid suspensions, each fluid suspension corresponding to a wheel, with each fluid suspension having a fluid actuator;
    a fluid flow control means for controlling fluid flow to and from the fluid actuator;
    a load detection means for detecting a suspension load applied to each fluid suspension;
    a torsional load calculation means for calculating a torsional load applied to the vehicle in response to the suspension load;
    a compensation control means for determining whether the torsional load is undesired and compensating a control amount for controlling the fluid flow control means to remove the undesired torsional load;
    a vehicle cornering state detection means for detecting a vehicle's running condition and for determining whether the vehicle is in a transient state or a steady cornering state in response to the vehicle running condition;
    a roll stiffness distribution determination means for calculating a desired roll stiffness distribution to front wheels and rear wheels in response to the transient state and the steady cornering state; and
    an increasing means for correcting the control amount for controlling the fluid flow control means to increase the desired roll stiffness distribution to front wheels during the transient cornering state.

5. An electronic controlled fluid suspension system according to claim 4, wherein the fluid flow control means includes:
    means for calculating a total compensation pressure amount for the fluid suspension according to both a feed-back control and a feed-forward control and for correcting the total compensation pressure amount in response to the torsional load and a corrected desired roll stiffness distribution to the front wheels.

6. An electronic controlled fluid suspension system for a vehicle according to claim 4 wherein the vehicle cornering detection means includes a means for detecting a vehicle speed and a steering angular speed and calculating an estimated lateral acceleration in relation to the vehicle speed and the steering angular speed, and the estimated lateral acceleration is used to determine the vehicle cornering state.

7. An electronic controlled fluid suspension system for a vehicle according to claim 4 wherein the vehicle cornering state detection means includes a means for detecting a vehicle acceleration, and the vehicle's acceleration is used to determine the vehicle cornering state.

* * * * *

UNITED STATES PATENT AND TRADEMARK OFFICE
CERTIFICATE OF CORRECTION

PATENT NO. : 4,937,748

DATED : June 6, 1990

INVENTOR(S) : Takashi YONEKAWA; Shuuichi BUMA; Toshio ABURAYA; Osamu TAKEDA; Shunichi DOI It is certified that error appears in the above-identified patent and that said Letters Patent is hereby corrected as shown below:

ON THE COVER PAGE:

[73], change "Kabushiki Kaisha Toyota Toyota Jidosha Kabushiki Kaisha, Japan" to --Kabushiki Kaisha Toyota Chuo Kenkyusho; and Toyota Jidosha Kabushiki Kaisha, both of Japan--.

Signed and Sealed this

Sixth Day of April, 1993

*Attest:*

STEPHEN G. KUNIN

*Attesting Officer*   Acting Commissioner of Patents and Trademarks